US010401955B2

(12) United States Patent
Song et al.

(10) Patent No.: US 10,401,955 B2
(45) Date of Patent: Sep. 3, 2019

(54) METHOD FOR DISPLAYING AN IMAGE AND AN ELECTRONIC DEVICE THEREOF

(71) Applicant: Samsung Electronics Co., Ltd., Gyeonggi-do (KR)

(72) Inventors: Insun Song, Gwangmyeong-si (KR); Jihwan Choe, Bucheon-si (KR); Yoonjeong Heo, Hwaseong-si (KR); Min-Jung Kim, Hwaseong-si (KR); Ji-Yoon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/592,109

(22) Filed: May 10, 2017

(65) Prior Publication Data

US 2018/0095533 A1 Apr. 5, 2018

(30) Foreign Application Priority Data

Sep. 30, 2016 (KR) .................... 10-2016-0126757

(51) Int. Cl.
*G06F 3/01* (2006.01)
*G06F 3/0346* (2013.01)
(Continued)

(52) U.S. Cl.
CPC ............... *G06F 3/013* (2013.01); *G01S 3/00* (2013.01); *G06F 3/0346* (2013.01); *G06T 3/0012* (2013.01); *H04N 5/23238* (2013.01)

(58) Field of Classification Search
CPC .......... G06F 3/013; G06F 3/011; G06F 3/012; G06F 3/005; G06F 1/163;
(Continued)

(56) References Cited

U.S. PATENT DOCUMENTS 6,930,703 B1 * 8/2005 Hubel .................. G03B 37/04
348/208.16
8,111,296 B2 2/2012 Min-Seok
(Continued)

FOREIGN PATENT DOCUMENTS

JP 2004054928 A 2/2004
JP 2014155168 A 8/2014
WO 2016048014 A1 3/2016

OTHER PUBLICATIONS

ISA/KR, "International Search Report," Application No. PCT/KR2017/004847, dated Aug. 17, 2017, Korean Intellectual Property Office, 3 pages.
(Continued)

*Primary Examiner* — Dong Hui Liang

(57) ABSTRACT

A method and an apparatus for displaying a panorama image in an electronic device are provided. A method for operating an electronic device according to the present disclosure includes displaying a first image generated based on a plurality of image frames, determining a gazing region on the first image, when the gazing region covers at least part of a seam, realigning the image frames based on at least one feature point of the gazing region, and displaying a second image generated through the realignment. The electronic device can provide a high-quality registered image to the user by adaptively stitching the displayed images by considering the user's gazing region.

20 Claims, 27 Drawing Sheets

(51) Int. Cl.
*H04N 5/232* (2006.01)
*G06T 3/00* (2006.01)
*G01S 3/00* (2006.01)

(58) Field of Classification Search
CPC ......... G06T 2207/20221; G06T 3/4038; G06T 2200/32; H04N 5/223238; H04N 5/3415; G02B 2027/0178; G02B 2027/014; G02B 2027/0123; G02B 2027/0138; G02B 27/0093; G02B 27/017
See application file for complete search history.

(56) References Cited

U.S. PATENT DOCUMENTS

| | | | |
|---|---|---|---|
| 8,345,961 B2 | 1/2013 | Li et al. | |
| 2002/0036649 A1* | 3/2002 | Kim | G06T 15/10 345/633 |
| 2003/0234866 A1 | 12/2003 | Cutler | |
| 2004/0042685 A1* | 3/2004 | Zhou | G06K 9/209 382/284 |
| 2008/0036875 A1 | 2/2008 | Jones et al. | |
| 2010/0054628 A1 | 3/2010 | Levy et al. | |
| 2013/0004100 A1* | 1/2013 | Putraya | G06T 3/4038 382/284 |
| 2013/0044108 A1 | 2/2013 | Tanaka et al. | |
| 2013/0128364 A1 | 5/2013 | Wheeler et al. | |
| 2014/0184640 A1* | 7/2014 | Putraya | G06T 3/4038 345/629 |
| 2014/0362173 A1* | 12/2014 | Doepke | H04N 5/23238 348/36 |
| 2016/0205391 A1* | 7/2016 | Kim | G09G 3/3225 348/51 |
| 2016/0269717 A1* | 9/2016 | Kato | H04N 13/243 |
| 2016/0301862 A1* | 10/2016 | Rantakokko | G06F 3/011 |
| 2017/0140791 A1* | 5/2017 | Das | G11B 27/036 |
| 2018/0032816 A1* | 2/2018 | Trapp | G06K 9/00617 |

OTHER PUBLICATIONS

ISA/KR, "Written Opinion of the International Searching Authority," Application No. PCT/KR2017/004847, dated Aug. 17, 2017, Korean Intellectual Property Office, 7 pages.

* cited by examiner

METHOD FOR DISPLAYING AN IMAGE AND AN ELECTRONIC DEVICE THEREOF

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Sep. 30, 2016, and assigned Serial No. 10-2016-0126757, the entire disclosure of which is hereby incorporated by reference.

TECHNICAL FIELD

The present disclosure relates generally to an electronic device. More particularly, the present disclosure relates to a method and an apparatus for displaying an image in an electronic device.

BACKGROUND

Thanks to remarkable advances in information communication technology and semiconductor technology, supply and use of an electronic device (e.g., a mobile terminal) are rapidly increasing. As the electronic device is widely supplied, the electronic device provides various contents to a user.

Various electronic devices which can be directly worn on a body are under development. Such wearable electronic devices can include, for example, a Head Mounted Device (HMD), smart glasses, a smart watch, a smart wristband, a contact lens-type device, a ring-type device, a shoe-type device, a clothes-type device, and a glove-type device. As such a wearable device is directly worn on the human body or the clothes, it can dramatically enhance portability and user accessibility.

Among the various examples of the wearable electronic device, the HMD, which can be worn on a user's head, can present a 360-degree panorama image at a position near user's both eyes and thus provide a realistic image to the user.

SUMMARY

To address the above-discussed deficiencies of the prior art, it is a primary aspect of the present disclosure to provide a method and an apparatus for displaying a panorama image in an electronic device.

Another aspect of the present disclosure is to provide a method and an apparatus for stitching a panorama image by considering a user's gazing region.

Yet another aspect of the present disclosure is to provide a method and an apparatus for realigning image frames for generating a panorama image by considering feature points of a user's gazing region.

Still another aspect of the present disclosure is to provide a method and an apparatus for not including a seam of a panorama image in a user's gazing region.

A further aspect of the present disclosure is to provide a method and an apparatus for forming a seam to minimize a stitching error of a close object in a panorama image.

A further aspect of the present disclosure is to provide a method and an apparatus for adjusting a brightness value of an image based on pixels of a gazing region on a panorama image.

A further aspect of the present disclosure is to provide a method and an apparatus for determining a user's gazing region as pixels which construct an object on a panorama image.

A further aspect of the present disclosure is to provide a method and an apparatus for stitching image frames by considering a movement direction of a user's gazing region on a panorama image.

A further aspect of the present disclosure is to provide a method and an apparatus for stitching image frames by considering a movement speed of a user's gazing region on a panorama image.

A further aspect of the present disclosure is to provide a method and an apparatus for sequentially stitching image frames by considering a user's gazing region range.

According to various embodiments of the present invention, a method for operating an electronic device comprises displaying a first image generated based on a plurality of image frames, determining a gazing region on the first image, realigning the image frames based on at least one feature point of the gazing region if the gazing region covers at least part of a seam of the first image, and displaying a second image generated through the realignment.

According to various embodiments of the present invention, an electronic device comprises a display for displaying a first image generated based on a plurality of image frames, and a processor for determining a gazing region on the first image and realigning the image frames based on at least one feature point of the gazing region when the gazing region covers at least part of a seam of the first image. A second image generated through the realignment is displayed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
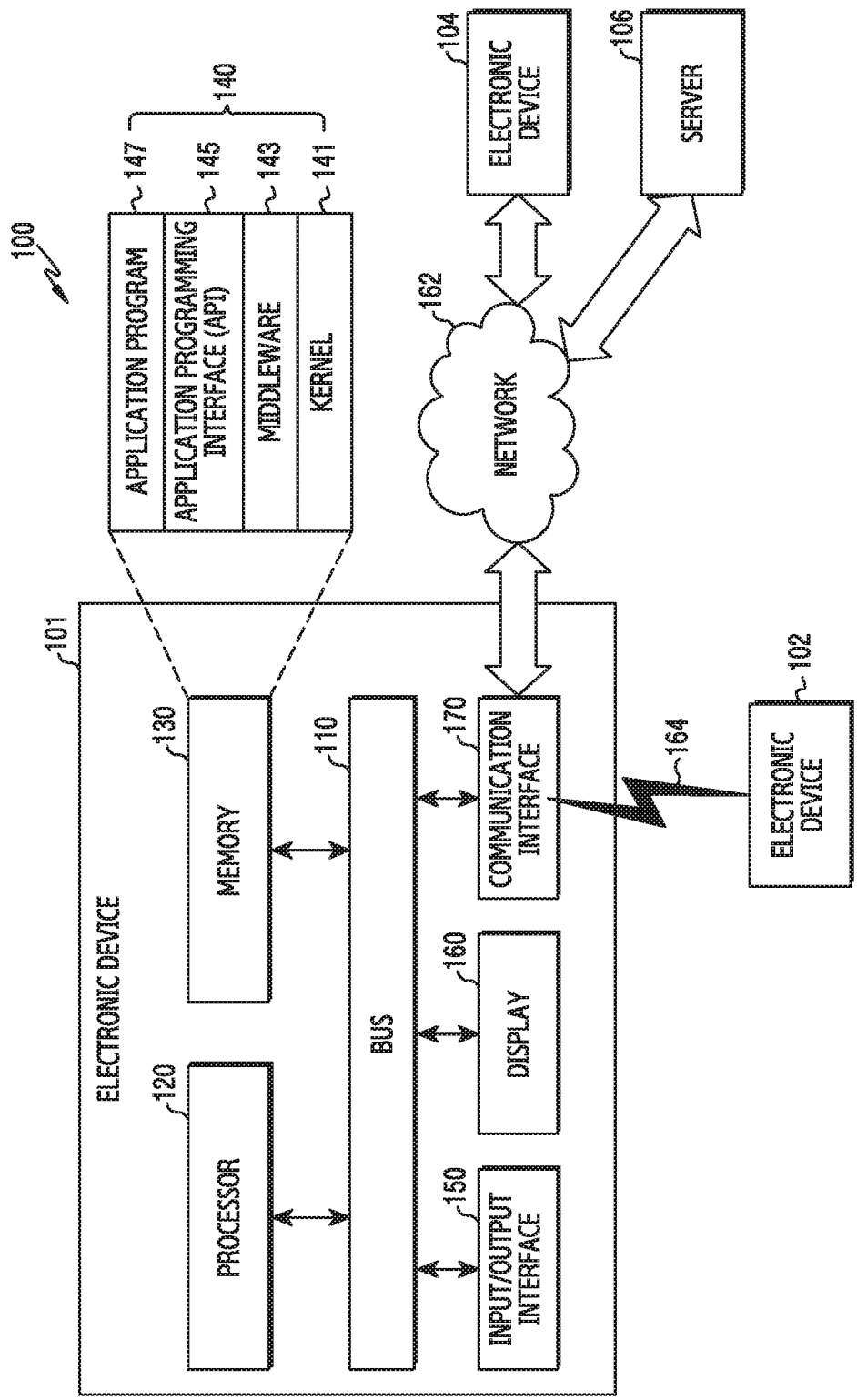
FIG. 1 illustrates a network environment including an electronic device according to various embodiments of the present disclosure.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first electronic device and a second electronic device may indicate different user devices regardless of order or importance thereof. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may, for example, include at least one of a television, a digital video disk (DVD) player, an audio player, a refrigerator, an air conditioner, a cleaner, an oven, a microwave oven, a washing machine, an air purifier, a set-top box, a home automation control panel, a TV box (e.g., HOMESYNC™ of Samsung, APPLE TV®, or GOOGLE TV®), a game console (e.g., XBOX®, PLAYSTATION®), an electronic dictionary, an electronic key, a camcorder, and an electronic frame.

According to another embodiment, the electronic device may include at least one of various medical devices (e.g., various portable medical measuring devices (a blood glucose measuring device, a heart rate measuring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Navigation Satellite System (GNSS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature-receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Prior to explanations, terms used in this disclosure are defined as below.

'image frame' indicates basic images for generating a panorama image. That is, a plurality of image frames is registered to generate one panorama image. Image frames can be generated through different cameras, or captured at certain time intervals by a single camera which is moving. Among a plurality of image frames, adjacent image frames for generating a panorama image include an overlapping object. In some cases, the image frame can be referred to variously as an image, a basic image, or a raw image.

'image stitching' or 'stitching' indicates a general operation for generating a panorama image from a plurality of image frames. More specifically, the image stitching aligns image frames to overlap a common region by matching feature points extracted from the image frames, determines a boundary of the overlap region of the aligned image frames, and applies at least one of exposure and color correction, and blending on the image based on the determined boundary. In some cases, the stitching can be variously referred to as blending, composing, combining, and registering.

'seam' indicates a boundary of adjacent image frames of the panorama image. The seam can be formed in an overlap region of adjacent image frames among the aligned image frames. Depending on an algorithm for generating the seam, different seams can be formed even in the same overlap region. In some cases, the seam can be variously referred to as a binding line, a combining line, a stitching line, and a registering line.

'double image' indicates that the same object is displayed at at least two different positions on the panorama image generated from multiple image frames. Parallax can arise when a plurality of cameras for generating a plurality of image frames captures the same object at different positions, and the double image can be caused by the parallax. For example, when two cameras at different positions each generate an image frame including the same distant object and the same close object and stitch the image frames so as to minimize distortion of the close object, the close object can be displayed like a single object on the whole panorama image but the distant object is not overlapped due to the parallax and can be displayed like two objects at two positions.

'close object cut' indicates that the object is askew based on the seam or part of the object is hidden by the seam on the panorama image generated from the image frames. For example, when two cameras at different positions each generate an image frame including the same distant object and the same close object and stitch the image frames so as to minimize distortion of the distant object, the distant object can be displayed like a single object on the whole panorama image but the close object may not overlap precisely. Hereafter, in the present disclosure, a distortion including the double image and the close range cut on the whole panorama image when the image frames are stitched is defined as a stitching error.

FIG. 1 illustrates a network environment including an electronic device according to various embodiments of the present disclosure.

Referring to FIG. 1, an electronic device 101, 102, or 104 or a server 106 may be connected with each other through a network 162 or a short range communication 164. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for interconnecting the elements 110 to 170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

According to various embodiments, the processor 120 can determine whether an object displayed in an image on the display 160 is a close object.

According to various embodiments, the processor 120 can stitch a plurality of image frames to generate a panorama image.

According to various embodiments, the processor 120 can determine a user's gazing region on the panorama image. The processor 120 can determine a movement speed and/or direction of the gazing region on the image.

According to various embodiments, the processor 120 can determine whether the gazing region covers a seam of the panorama image. According to whether or not the gazing region includes the seam of the panorama image, the processor 120 can perform an additional operation on the image.

The memory 130 may include a volatile memory and/or a non-volatile memory. The memory 130 may store, for example, instructions or data relevant to at least one other element of the electronic device 101. According to an embodiment, the memory 130 may store software and/or a program 140. According to various embodiments, the memory 130 can store the image frames for generating the panorama image. The memory 130 can store the panorama image generated from the image frames.

According to various embodiments, the memory 130 can store a location of a seam determined to generate the panorama image.

The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Also, the input/output interface 150 may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of contents (for example, text, images, videos, icons, or symbols) for the user. The display 160 may include a touch screen and receive, for example, a touch, gesture, proximity, or hovering input by using an electronic pen or the user's body part.

According to various embodiments, the display 160 can display the panorama image generated from the image frame.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

According to various embodiments, the communication interface 170 can receive the image frames for generating the panorama image from the server 106. The communication interface 170 may receive a generated panorama image.

According to various embodiments, the communication interface 170 can receive statistical data of a general eye movement pattern for the image frames from the server 106.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may include at least one of, for example, WI-FI®, BLUETOOTH®, Near Field Communication (NFC), Magnetic Stripe Transmission (MST), and Global Navigation Satellite System (GNSS).

The MST may generate a pulse according to transmission data using an electromagnetic signal and the pulse may generate a magnetic field signal. The electronic device 101 may transmit the magnetic field signal to a Point Of Sales (POS) device, and the POS device may detect the magnetic field signal using an MST reader and convert the detected magnetic field signal to an electric signal to restore the data.

The GNSS may include at least one of, for example, a Global Positioning System (GPS), a Global navigation satellite system (GLONASS), a BEIDOU navigation satellite system (hereinafter, referred to as "BEIDOU"), and GALILEO (European global satellite-based navigation system). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104) or the server 106 may execute the requested functions or the additional functions, and may deliver a result of the execution to the electronic device 101. The electronic device 101 may process the received result as it is or additionally to provide the requested functions or services. To this end, for example, cloud computing, distributed computing, or client-server computing technology may be used.

Figure 2:
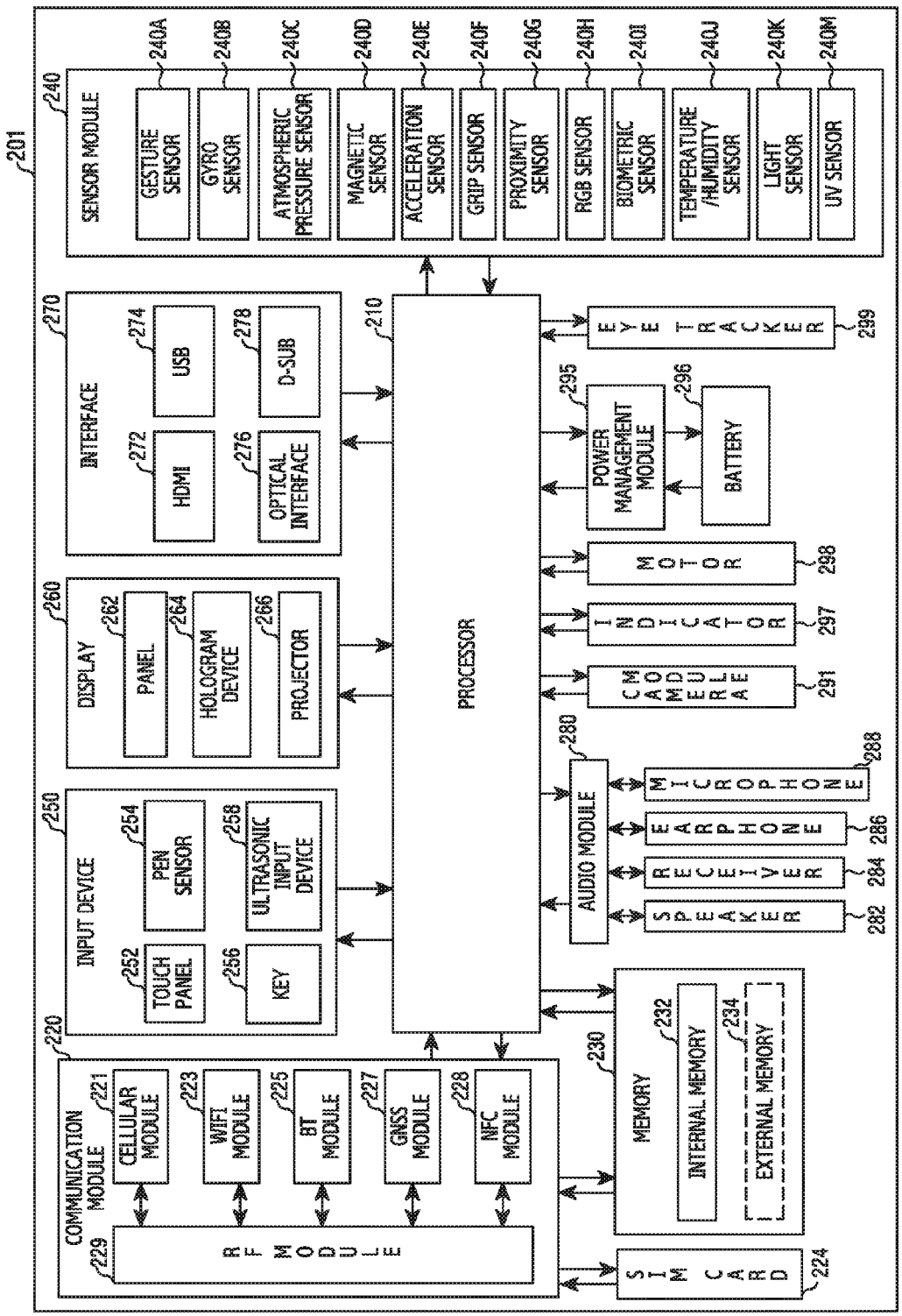
FIG. 2 illustrates a block diagram of an electronic device according to various embodiments of the present disclosure.

FIG. 2 illustrates a block diagram of an electronic device 201 according to various embodiments of the present disclosure.

For example, the electronic device 201 may include the whole or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

According to various embodiments, the processor 210 can determine whether an object in an image displayed on the display 160 is a close object.

According to various embodiments, the processor 210 can stitch a plurality of image frames to generate a panorama image.

According to various embodiments, the processor 210 can determine a user's gazing region on the panorama image. The processor 210 can determine a movement speed and/or direction of the gazing region on the image.

According to various embodiments, the processor 210 can determine whether the gazing region covers a seam of the panorama image. According to whether the gazing region includes the seam of the panorama image, the processor 120 can perform an additional operation for the image.

The communication module 220 may have a configuration equal or similar to that of the communication interface 170 of FIG. 1. The communication module 220 may include, for example, a cellular module 221, a Wi-Fi module 223, a BlueTooth module 225, a GNSS module 227 (for example, a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an exemplary embodiment of the present invention, the cellular module 221 may perform at least some of the functions that the processor 210 may provide. According to an exemplary embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228, may be included in one Integrated Chip (IC) or IC package.

The RF module 229 may transmit/receive, for example, a communication signal (for example, an RF signal). The RF module 229 may include, for example, a transceiver, a Power Amp Module (PAM), a frequency filter, a Low Noise Amplifier (LNA), or an antenna. According to another embodiment, at least one of the cellular module 221, the Wi-Fi module 223, the Bluetooth module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

According to various embodiments, the communication module 220 can receive the image frames for generating the panorama image from the server 106. The communication module 220 may receive a generated panorama image.

According to various embodiments, the communication module 220 can receive statistical data of a general eye movement pattern relating to the image frames from the server 106.

The memory 230 (for example, the memory 130) may include, for example, an internal memory 232 or an external memory 234. The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard driver, or a Solid State Drive (SSD).

An external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Mult-Media Card (MMC), a memory stick, or the like. The external memory 234 may be functionally and/or physically connected to the electronic device 201 through various interfaces.

The security module 236 is a module including a storage space having a higher security level than that of the memory 230 and may be a circuit guaranteeing safe data storage and a protected execution environment. For example, an electronic device may encrypt data (e.g., biometric information, personal information, or card information) which requires a high security level, and may store, in the security module 236, a key that is used for encryption. The security module 236 may be implemented by a separate circuit and may include a separate processor. The security module 236 may exist in, for example, a detachable smart chip or Secure Digital (DS) card, or may include an embedded Secure Elements (eSE) embedded in a fixed chip of the electronic device 201. Further, the security module 236 may be operated by an Operating System (OS) that is different from the OS of the electronic device 201. For example, the security module may operate on the basis of a Java Card Open Platform (JCOP) operating system.

According to various embodiments, the memory 230 can store the image frames for generating the panorama image. The memory 230 can store the panorama image generated from the image frames.

According to various embodiments, the memory 230 can store a location of a seam determined to generate the panorama image.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some exemplary embodiments of the present invention, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive scheme, a resistive scheme, an infrared scheme, and an ultrasonic scheme. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wave generated by an input tool through a microphone (for example, the microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be configured by one module. The hologram device 264 may show a three dimensional image in the air by using an interference of light. The projector 266 may display an image by projecting light onto a screen. The screen may be located, for example, inside or outside the electronic device 201. According to an exemplary embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

According to various embodiments, the display 260 can display the panorama image generated from the image frame.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

According to various embodiments, the camera module 291 can include two camera lenses at different positions. When capturing an image, the camera module 291 can distinguish a close object and a distant object (e.g., background) on the captured image using an angle of the two camera lens and the object. The processor 210 can determine a depth value corresponding to pixels of the close object and the distant object using the angle information of the two camera lenses and the objects, and store the depth value in the memory 230.

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like, and may further include additional circuits (e.g., a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery or a solar battery.

The indicator 297 may indicate a particular state (e.g., a booting state, a message state, a charging state, or the like) of the electronic device 201 or a part (e.g., the processor 210) of the electronic device 2201. The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO®.

Figure 4:
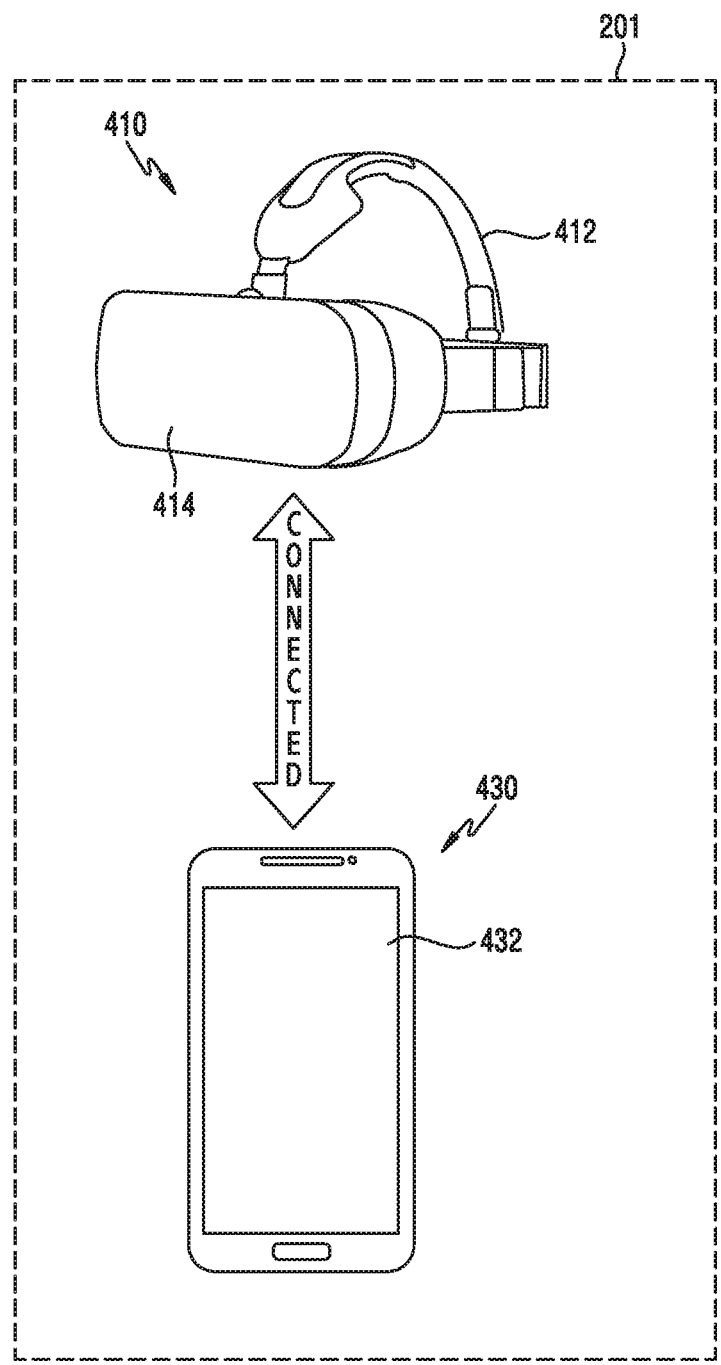
FIG. 4 illustrates a wearable device and a user device according to various embodiments of the present disclosure.

The eye tracker 299 can track eyes of the user. For example, if the electronic device 201 comprises a wearable device 401 as illustrated in FIG. 4, the eye tracker 299 can track eye of the user wearing the wearable device 401. In specific, an infrared camera in camera module 291 can be equipped with two light sources, and can generate two reflection points on a cornea surface of eyes of the user. The eye tracker 299 can determine center point between the two generated reflection points, and can track eyes of the user by using the center points of the reflection points and center points of pupils of the eyes.

Each of the components of the electronic device according to the present disclosure may be implemented by one or more components, and the name of the corresponding component may vary depending on the type of the electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
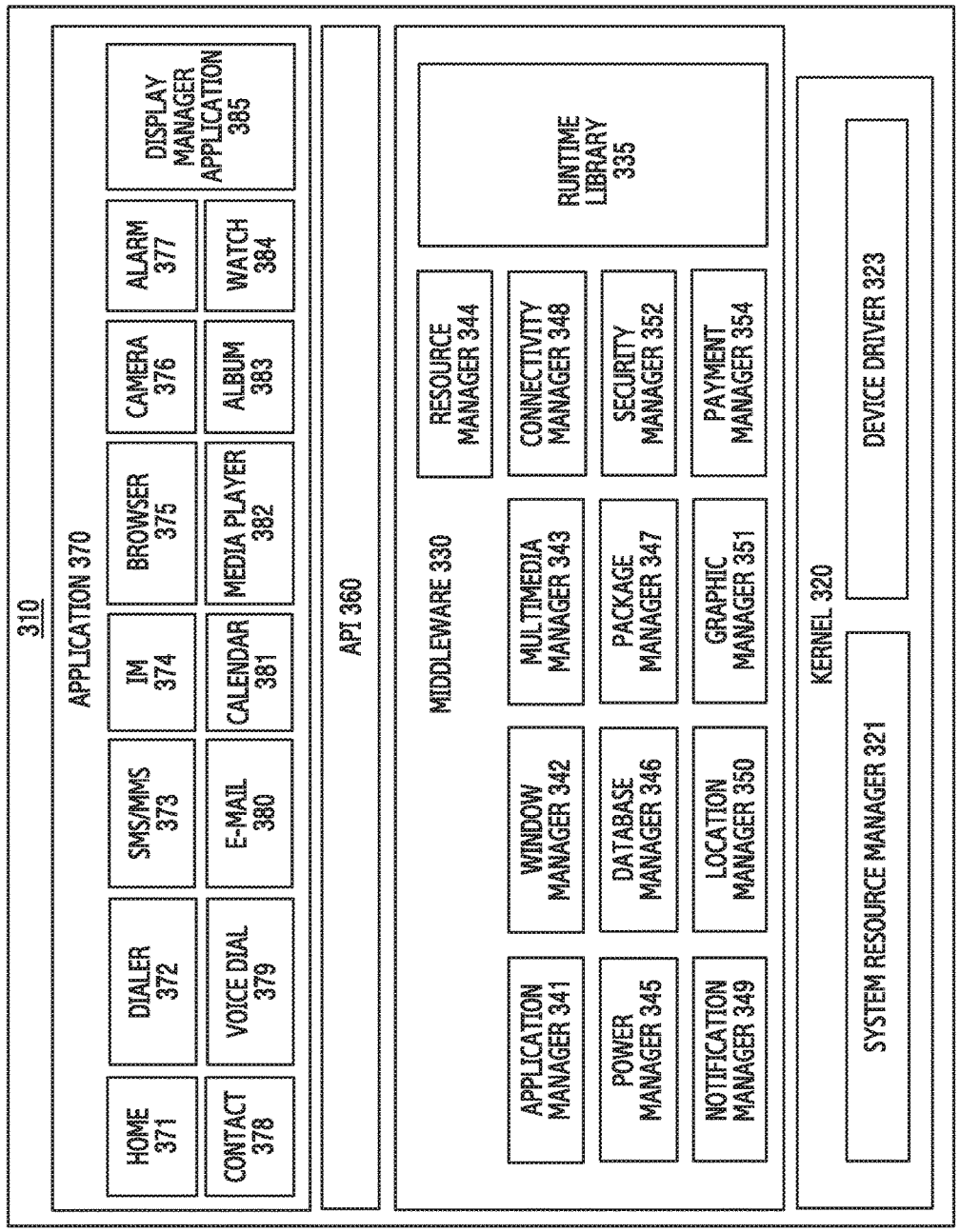
FIG. 3 illustrates a block diagram of a program module according to various embodiments of the present disclosure.

FIG. 3 illustrates a block diagram of a program module according to various embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, ANDROID®, iOS WINDOWS®, SYMBIAN®, TIZEN®, SAMSUNG BADA®, or the like.

The program module 310 may include a kernel 320, middleware 330, an Application Programming Interface (API) 360, and/or an application 370. At least some of the program module 310 may be preloaded on the electronic device, or may be downloaded from an external electronic device (e.g., the electronic device 102 or 104, or the server 106).

The kernel 320 (for example, the kernel 141) may include, for example, a system resource manager 321 and/or a device driver 323. The system resource manager 321 may perform the control, allocation, retrieval, or the like of system resources. According to an exemplary embodiment of the present invention, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a payment manager 354.

The runtime library 335 may include a library module which a compiler uses in order to add a new function through a programming language while the applications 370 are being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like of at least one of the applications 370.

The power manager 345 may operate together with a Basic Input/Output System (BIOS) to manage a battery or power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, WI-FI® or BLUETOOTH®. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an exemplary embodiment of the present disclosure, when the electronic device (for example, the electronic device 101) has a telephone call function, the middleware 330 may further include a telephony manager for managing a voice call function or a video call function of the electronic device. The payment manager 354 may relay information for payment from the application 370 to the application 370 or kernel 320. Further, the payment manager 354 may store information related to the payment, which has been received from an external device, in the electronic device 200 or transfer the internally stored information to an external device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dial 379, email 380, calendar 381, media player 382, album 383, clock, health care (for example, measure exercise quantity or blood sugar), or environment information (for example, atmospheric pressure, humidity, or temperature information).

According to an exemplary embodiment of the present invention, the applications 370 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

For example, the device management application may manage (for example, install, delete, or update) at least one function of an external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an exemplary embodiment, the applications 370 may include applications (for example, a health care application of a mobile medical appliance or the like) designated according to attributes of the external electronic device 102 or 104. According to an embodiment of the present disclosure, the application 370 may include an application received from the external electronic device (e.g., the server 106, or the electronic device 102 or 104). According to an exemplary embodiment of the present invention, the application 370 may include a preloaded application or a third party application which can be downloaded from the server. Names of the elements of the program module 310, according to the above-described embodiments of the present invention, may change depending on the type of OS.

According to various exemplary embodiments of the present invention, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

According to various embodiments, the display manager application 385 can operate an image displayed on the display 260 of the electronic device 201. For example, the display manager application 385 can operate a panorama image to change a seam location which distinguishes the image frames on the panorama image generated by registering the image frames.

The term "module," as used in this disclosure can imply a unit including hardware, software, and firmware, or any suitable combination. The term "module" can be interchangeably used with terms such as logic, logical block, component, circuit, and the like. A module can be a minimum unit of an integral component or for performing one or more functions, or can be a part thereof. A module can be mechanically or electrically implemented. For example, a module can include an Application-Specific Integrated Circuit (ASIC) chip, a Field-Programmable Gate Arrays (FPGAs), or a programmable-logic device, which are known or will be developed to perform certain operations. At least part of a device (e.g., modules or functions thereof) or a method (e.g., operations) according to various embodiments of the present disclosure can be implemented with instructions stored in a computer-readable storage medium (e.g., the memory 130) as a program module. When the instruction is executed by a processor (e.g., the processor 120), the processor can perform a function corresponding to the instruction. The computer readable recording medium can include a hard disk, a floppy disc, a magnetic medium (e.g., a magnetic tape), an optical storage medium (e.g., a Compact Disc-ROM (CD-ROM) or a DVD), a magnetic-optic medium (e.g., a floptical disc), and an internal memory. The instruction can include code generated by a compiler or code executable by an interpreter. The module or program module according to various embodiments can further include at least one or more components among the aforementioned components, or can omit some of them, or can further include additional other components. Operations performed by modules, program modules, or other components according to the various embodiments of the present disclosure can be executed in a sequential, parallel, repetitive, or heuristic manner. Some of the operations can be executed in a different order or may be omitted, or other operations can be added.

FIG. 4 illustrates a wearable device and a user device according to various embodiments of the present disclosure. FIG. 4 depicts an electronic device 201 including a combination of a wearable device 410 and a user device 430.

Referring to FIG. 4, the electronic device 201 according to various embodiments is the combination of the wearable device 410 and the user device 430. The wearable device 410 is put on a user's head and includes a display 432. The wearable device 410 can include a strap 412 to be fastened on the user's head, and a fastening unit 414 (e.g., a clip, a hole, a cover, etc.) for coupling with the user device 430. To present an image to the user, the display 432 of the user device 430 can be used.

For data exchange, the wearable device 410 and the user device 430 can communicate with each other. For example, the user device 430 can be physically attached to the wearable device 410, and the wearable device 410 and the user device 430 can communicate with each other through a wire (e.g., cable) through physical connection. For example, the user device 430 may not be physically attached to the wearable device 410, and the wearable device 410 can use tethering of the user device 430 for the communication. In this case, the user device 430 and the wearable device 410 can fulfill the communication over a radio channel. Even when the user device 430 is physically attached to the wearable device 410, the wearable device 410 and the user device 430 can communicate over a radio channel. For example, data transmitted from the wearable device 410 to the user device 430 can include information of a user input detected through an input interface (e.g., a touch pad, a button) of the wearable device 410. The data transmitted from the user device 430 to the wearable device 410 can include sensing information of a user's movement.

To provide an image corresponding to the user's movement, the wearable device 410 or the user device 430 can include at least one sensor (not shown). For example, the at least one sensor can include an accelerometer for obtaining user's movement information, a GPS receiver, or at least one sensor for detecting other motion. A user's head gesture can be detected through the at least one sensor.

In the embodiment of FIG. 4, the image is displayed through the display 432 of the user device 430. According to another embodiment, the wearable device 410 can include a display (not shown) separately from the display 432. In this case, the image can be displayed through the display of the wearable device 410. For doing so, the wearable device 410 can include an independent operation device.

In the embodiment of FIG. 4, the electronic device 201 is the combination of the wearable device 410 and the user device 430. According to another embodiment, the wearable device 410 can include all of the necessary components including the display for the image displaying. In this case, the electronic device 201 can include the wearable device 410 alone, and the wearable device 410 can be referred to as an HMD. According to yet another embodiment, the user device 430 can include all of the necessary components for displaying the image. In this case, the wearable device 410 is simply an auxiliary device for the mounting, and the electronic device 201 can include the user device 430 alone. Hereafter, in various embodiments to be explained, the electronic device 201 can include the combination of the wearable device 410 and the user device 430, or include only one of the wearable device 410 and the user device 430.

Figure 5:
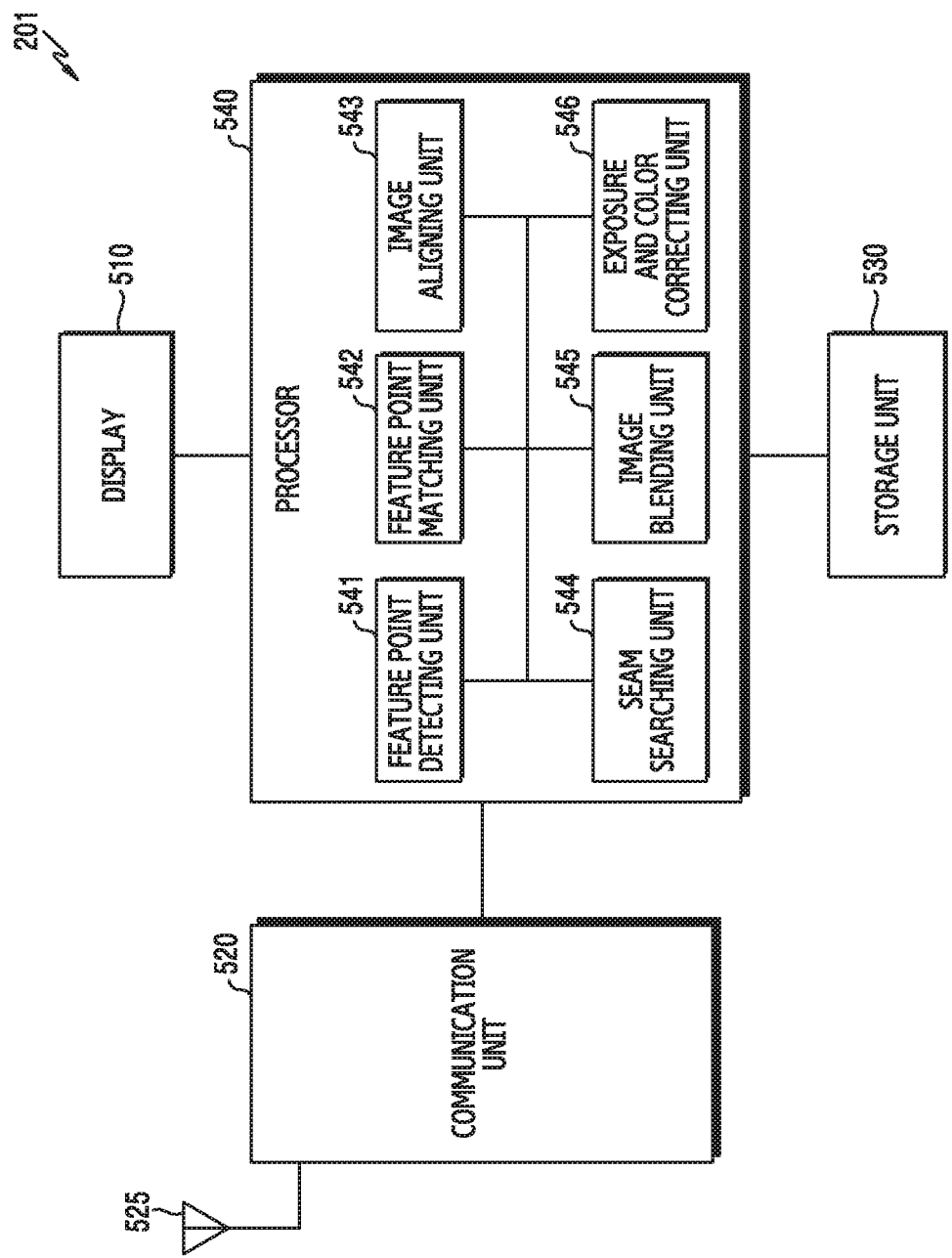
FIG. 5 illustrates a functional block diagram of an electronic device according to various embodiments of the present disclosure.

FIG. 5 illustrates a functional block diagram of an electronic device 201 according to various embodiments of the present disclosure. As shown in FIG. 5, the electronic device 201 can include a display 510, a communication unit 520, a storage unit 530, and a processor 540.

The display 510 displays a screen including an image, graphics, text, and the like. For example, the display 510 can include a liquid crystal, a light emitting diode display, or other material. The display 510 can display a screen corresponding to data received through the processor 540. The display 510 can include a touch screen for detecting a user's input. According to various embodiments, the display 510 can display a panorama image generated from a plurality of image frames.

The communication unit 520 can receive an RF signal. For doing so, the communication unit 520 can include at least one antenna 525. The communication unit 520 downconverts a signal received to generate an Intermediate Frequency (IF) or baseband signal. The communication unit 520 can include a receive processing circuit for generating a baseband signal processed by filtering, decoding, and/or digitizing the baseband or IF signal. The receive processing circuit can send the processed baseband signal to a speaker for voice data, or to the processor 540 for a further processing (e.g., web browsing data).

The communication unit 520 can include at least one transceiver. The at least one transceiver receives outgoing baseband data (e.g., web data, e-mail, interactive video game data) from the processor 540. A transmit processing circuit encodes, multiplexes, and digitizes the outgoing baseband data to generate the processed baseband or IF signal. The communication unit 520 up-converts the outgoing baseband or IF signal processed in the transmit processing circuit, to an RF signal to send over an antenna.

According to various embodiments, for example, the communication unit 520 can receive data from an application provider over the network 162, and transmit data to the application provider over the network 162. The communication unit 520 can receive a feedback of the transmitted data from the application provider, and provide the processor 540 with the information processed based on the feedback to. For example, the communication unit 520 can receive from the serve 106 a plurality of image frames for generating a panorama image. The communication unit 520 may receive a generated panorama image. The communication unit 520 can receive from the server 106 statistical data about a general eye movement pattern on the image frames.

The storage unit 530 is coupled to the processor 540. Part of the storage unit 530 can include a Random Access Memory (RAM), and another part of the storage unit 530 can include a flash memory or other Read Only Memory (ROM). According to various embodiments, the storage unit 530 can store the image frames for generating the panorama image. The storage unit 530 can store the panorama image generated from the image frames. The storage unit 530 can store a seam location determined to generate the panorama image.

The processor 540 can control the communication unit 520, the display 510, and the storage unit 530, which are functionally coupled with the processor 540. For example, using the communication unit 520, the processor 540 can control reception of a forward channel signal and transmission of a reverse channel signal. In some embodiments, the processor 540 includes at least one microprocessor or microcontroller.

The processor 540 can execute other processor or program in the storage 530. The processor 540 can move or fetch data to or from the storage unit 530 as requested by an executed process. In some embodiments, the processor 540 is configured to execute an application in response to a received signal based on an Operating System (OS).

According to various embodiments, the processor 540 can perform an operation to generate the panorama image from the image frames. Herein, the image generated based on the image frames can be a 360-degree image. The processor 540 can adaptively change the panorama image by operating the generated panorama image. For example, the processor 540 can realign the image frames. The processor 540 can change a location of at least one seam on the panorama image. For doing so, the processor 540 can include a feature point detecting unit 541, a feature point matching unit 542, an image aligning unit 543, a seam searching unit 544, an image blending unit 545, and an exposure and color correcting unit 546.

Figure 6:
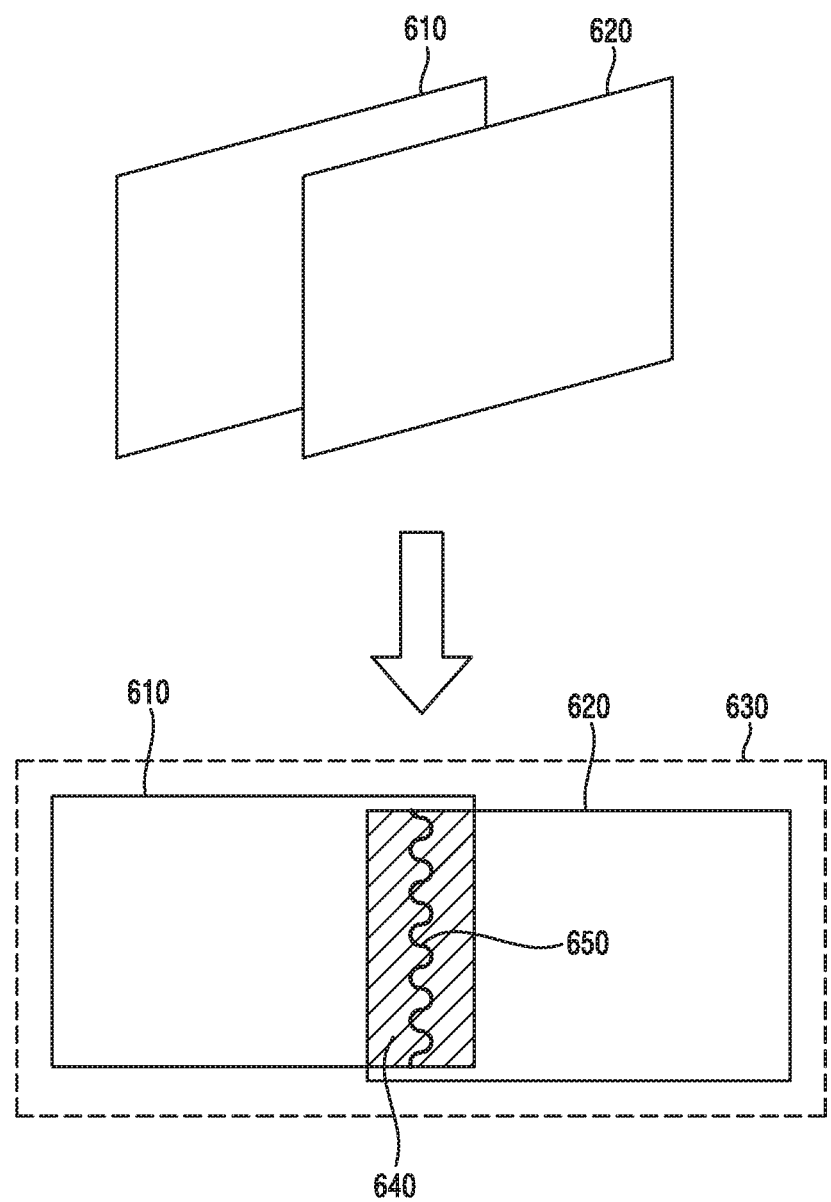
FIG. 6 illustrates an image stitching according to various embodiments of the present disclosure.

The feature point detecting unit 541 can detect feature points of the image frames stored in the storage unit 530 to generate one panorama image 630. For example, when the one panorama image 630 is generated based on two image frames 610 and 620 as shown in FIG. 6, the feature point detecting unit 541 can detect feature points from corners of the image frames 610 and 620. For example, the feature point detecting unit 541 can detect feature points from other portions than the corners of the image frames 610 and 620 according to other algorithm for generating the panorama image.

The feature point matching unit 542 can detect corresponding points based on the feature points extracted by the feature point detecting unit 541. For example, the feature point matching unit 542 can determine the corresponding points by comparing pixel values of the extracted feature points of the image frames 610 and 620 and associating feature points having the same or similar pixel value.

The image aligning unit 543 can align the image frames based on the corresponding points determined by the feature point matching unit 542. For example, the image aligning unit 543 can move at least one of the image frames 610 and 620 to minimize distances between the corresponding points in the feature points of the image frames 610 and 620. That is, the image aligning unit 543 can move at least one of the image frames 610 and 620 to overlap the corresponding points and thus superimpose the image frames 610 and 620. As the image frames 610 and 620 are superimposed, an overlap region 640 can be generated as shown in FIG. 6.

The seam searching unit 544 can detect a seam which is a boundary distinguishing the image frames in the overlap region of the image frames. For example, when the single panorama image 630 is generated based on the two image frames 610 and 620 as shown in FIG. 6, the seam searching unit 544 can detect a seam 650 in the overlap region 640 of the image frames 610 and 620. The seam searching unit 544 can detect the seam 650 based on various algorithms. For example, the seam searching unit 544 can determine the seam to minimize a difference of a pixel value and a color and brightness parameter of pixels of each image frame near the seam. The seam searching unit 544 can search for candidate seams in order to determine an optimal seam in the overlap region of the image frames 610 and 620, and assign a seam search weight based on the a difference of a pixel value and a color and brightness parameter of each candidate seam found. In other words, the seam searching unit 544 can allocate a higher weight for a smaller difference of the pixel value and the color and brightness parameter of adjacent image frames distinguished by the candidate seams. The seam searching unit 544 can determine the seam of the highest seam search weight among the searched candidate seams, as the seam 650 of the overlap region 640. Further, the seam searching unit 544 can find the seam by adjusting the seam search weight on pixels of a particular region in the overlap region of the image frames. For example, the seam searching unit 544 can set the seam search weight for the pixels of the particular region, below a threshold so that the searched seam does not include the pixels of the particular region or the seam including the pixels of the particular region is found with a low priority. According to various embodiments, the seam searching unit 544 can store the determined seam location on the panorama image in the storage unit 530.

The image blending unit 545 can blend the image frames based on the seam determined by the seam searching unit 544. For example, the image blending unit 545 can blend image frames in the overlap region 640 of the image frames 610 and 620 such that the regions divided by the seam 650 in the generated panorama image 630 are seamlessly connected.

The exposure and color correcting unit 546 can correct exposure and color of the whole panorama image including the image frames. That is, the exposure and color correcting unit 546 can uniform exposure and color parameters of the pixels of the image frames 610 and 620 throughout the panorama image 630, and thus minimize a stitch error due to the seam 650.

Hereafter, whole or part of the operations of the feature point detecting unit 541, the feature point matching unit 542, the image aligning unit 543, the seam searching unit 544, the image blending unit 545, and the exposure and color correcting unit 546 are defined as 'image stitching'.

According to various embodiments, the processor 540 cam determine whether an object in an image on the display 510 is a close object. For example, the processor 540 can determine whether the object in the image is a close object based on a depth value corresponding to pixels of the image. For example, the processor 540 can determine whether the object is a close object by detecting an object movement on the image.

So far, while the two image frames 610 and 620 are used to generate the single panorama image to ease the understanding, the electronic device 201 can generate one or two or more panorama images using three or more image frames. The operations or tasks conducted by the functional components 541 through 546 of the processor 540 for the panorama image generation can be carried out independently, and the electronic device 201 can generate a panorama image without the operation of some component. The above-stated panorama image generation is exemplary, and the electronic device 201 can generate a panorama image from image frames in other various manners.

While the electronic device 201 includes the display 510, the communication unit 520, the storage unit 530, and the processor 540 in FIG. 5 by way of example, the electronic device 201 may further include other component and some of the display 510, the communication unit 520, the storage unit 530, and the processor 540 can be omitted.

According to various embodiments, the electronic device 201 adaptively stitches image frames according to a gazing area. In general, the gazing area indicates an area where user's binocular visions match and the user can clearly see an object. For example, the gazing region can be divided into a foveal area and a parafoveal area as shown in FIG. 7.

Figure 7:
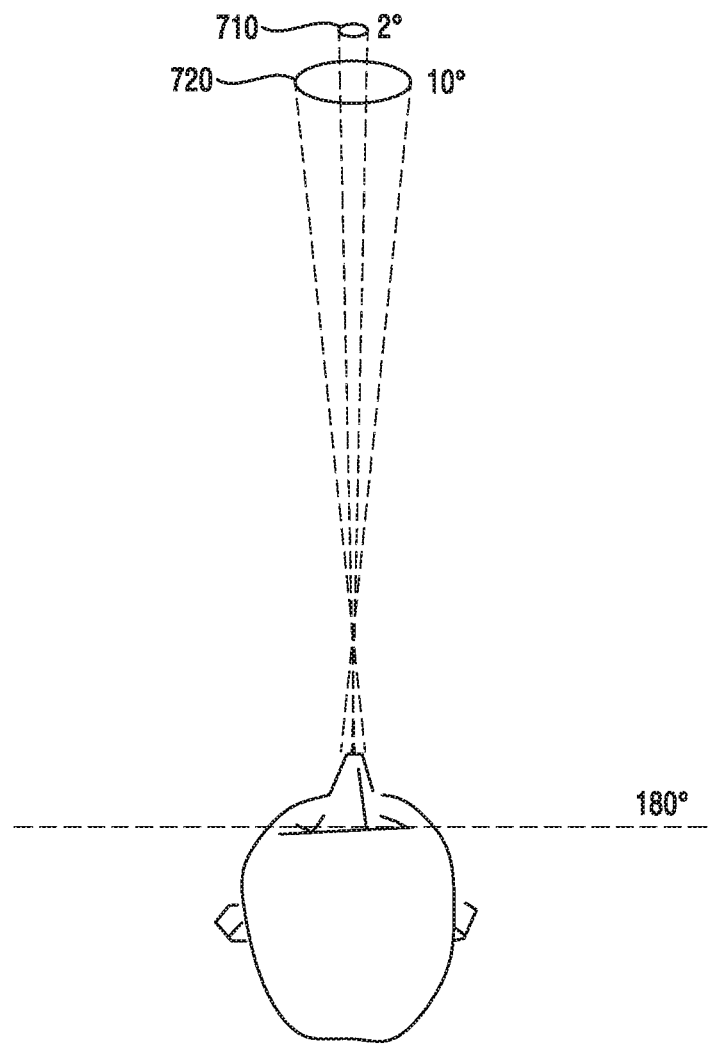
FIG. 7 illustrates a user's gazing regions according to various embodiments of the present disclosure.

FIG. 7 illustrates a user's gazing areas according to various embodiments of the present disclosure. Referring to FIG. 7, a foveal area 710 indicates a center portion of a user's vision. That is, the foveal area 710 corresponds to one degree to two degrees of a user's vision, and indicates an area where the user can see an object most clearly. A parafoveal area 720 indicates a peripheral area based on the foveal area 710. Namely, the parafoveal area 720 corresponds to two degrees to ten degrees of the user's vision, where the user can recognize a shape and/or a color of the object but cannot recognize a detailed shape of the object or texts printed on the object. The angle ranges (one degree to two degrees, two degrees to ten degrees) corresponding to the foveal area and the parafoveal area are exemplary, and the foveal area and the parafoveal area can be defined with arbitrary angle ranges.

Figure 20:
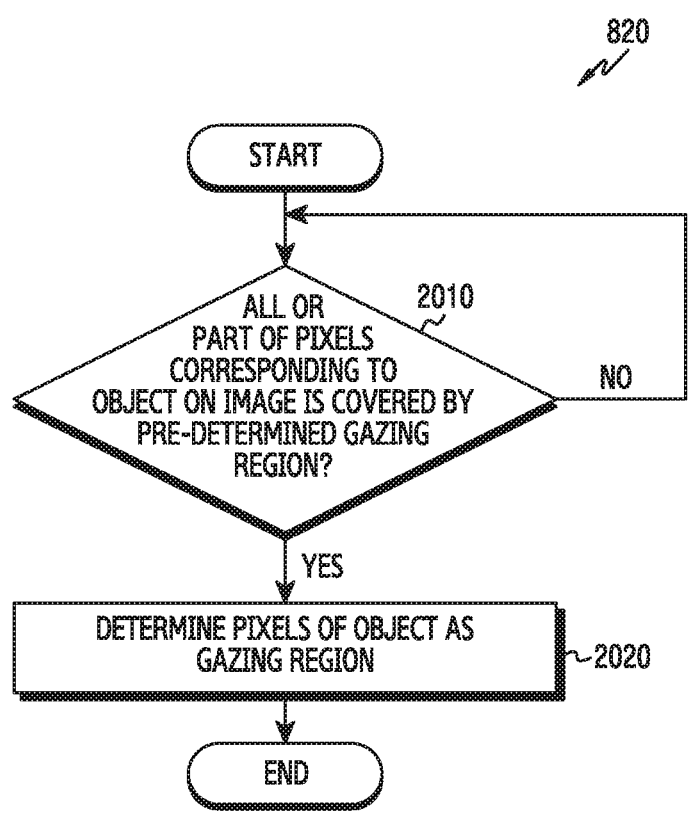
FIG. 20 illustrates a flowchart of a method for determining a gazing region to include an object displayed on an image according to various embodiments of the present disclosure.
Figure 21:
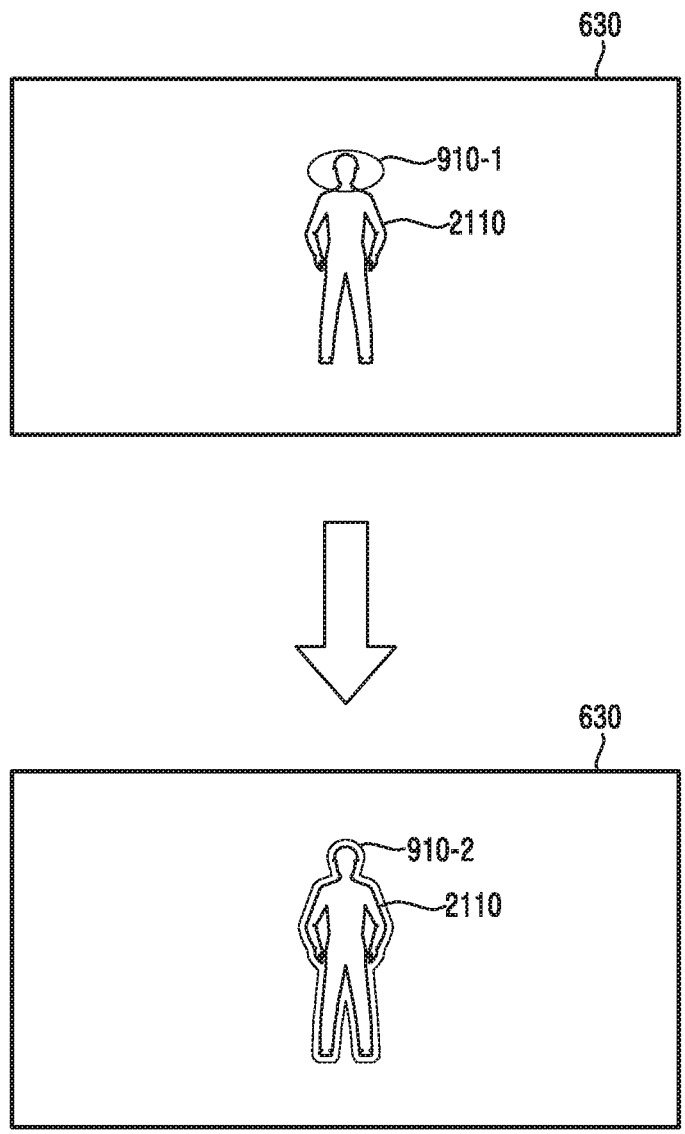
FIG. 21 illustrates operations for an object displayed on an image as a user's gazing region according to various embodiments of the present disclosure.

According to various embodiments, the type of the gazing region is not limited to any one of the foveal area 710 and the parafoveal area 720. For example, when the user views a particular object on the panorama image, the processor 540 can determine a region of the particular object of the foveal area, as a gazing region as shown in FIGS. 20 and 21.

While the foveal area 710 and/or the parafoveal area 720 are/is oval in FIG. 7 by way of example, the foveal area 710 and/or the parafoveal area 720 can be defined in various shapes. For example, when the gazing region is defined as an object region, the shape of the gazing region can depend on a shape of the object. In this case, a region of pixels presenting an object including a pixel of at least one point the user gazes at, can be determined as the gazing region. For doing so, the electronic device can identify at least one pixel corresponding to the user's gazing point, identify an object in the pixel, and then determine pixels presenting the object as the gazing region.

According to various embodiments, the user who is wearing the electronic device 201 can view a 360-degree panorama image generated based on a plurality of image frames displayed by the electronic device 201. In this case, the electronic device 201 can determine a location of the user's gazing region on the panorama image. More specifically, the eye tracker 299 of the electronic device 201 can locate the user's eyes on the display 510 of the electronic device 201 by tracking the user's eyes, who is wearing the electronic device 201, and determine a location of the user's gazing region on the panorama image by considering the panorama image displayed at the corresponding location. When the panorama image on the electronic device 201 moves, the user's gazing region can be determined at a different location on the same panorama image. For example, when the user wearing the electronic device 201 moves his/her head, the electronic device 201 can detect a speed and/or a direction of the user's head gesture, and the panorama image can move on the display 510 of the electronic device 201 based on the detected speed and/or direction. In this case, the gazing region can be located along the user's gaze on the moved panorama image. That is, depending on the user's manipulation, the gazing region can be positioned at a different location from the initial location on the panorama image.

The panorama image can be generated based on a plurality of image frames, and include seams which are boundaries between the image frames. Accordingly, the user's gazing region can be determined at one of the seams on the panorama image. Particularly, since the user views the foveal area of which the angle of view ranges 1 degree to 2 degrees, the user can feel image quality degradation when the user views the panorama image and the foveal area is placed at the seam on the panorama image. To address such problems, various embodiments of the present disclosure provide a method and an apparatus for adaptively stitching by considering the location of the user's gazing region on the panorama image.

Figure 8:
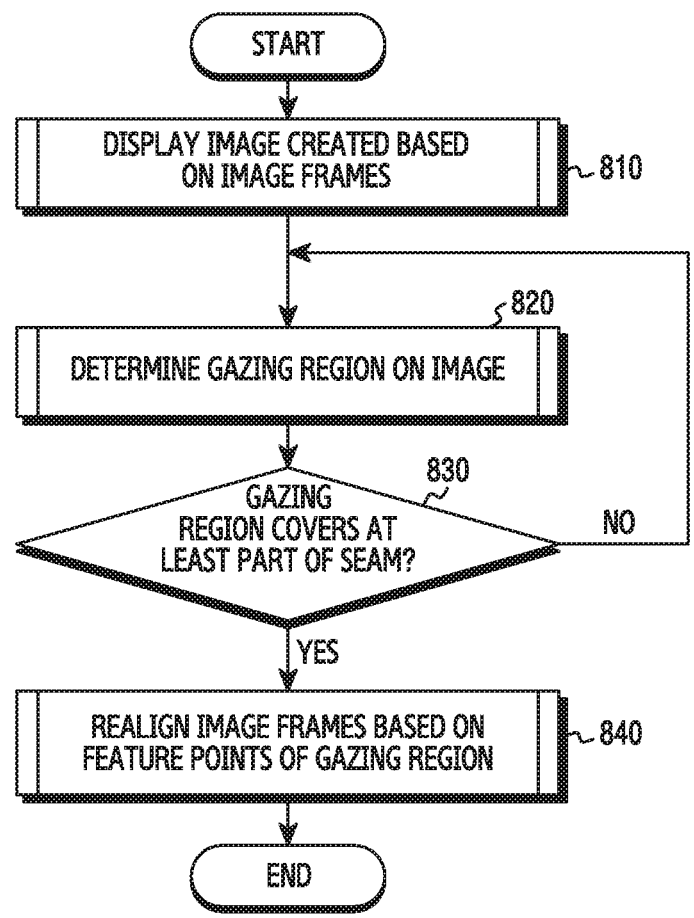
FIG. 8 illustrates a flowchart of an adaptive image stitching method in an electronic device according to various embodiments of the present disclosure.

FIG. 8 illustrates a flowchart of an adaptive image stitching method in an electronic device according to various embodiments of the present disclosure.

Referring to FIG. 8, in operation 801, the processor 540 displays an image generated based on a plurality of image frames. The processor 540 can generate a panorama image from the image frames by use of the function of at least one of the feature point detecting unit 541, the feature point matching unit 542, the image aligning unit 543, the seam searching unit 544, the image blending unit 545, and the exposure and color correcting unit 546 therein. More specifically, the processor 540 can detect feature points of the image frames, determine a corresponding point from the detected feature points, align the image frames based on the corresponding point, determine a seam in an overlap region of the aligned image frames, correct exposure and color of the image frames based on the seam, and generate the panorama image through blending.

In operation 820, the processor 540 determines a gazing region on the generated image. For example, when the electronic device 201 includes the wearable device 410, the processor 540 can detect where the user's eyes stay on the display of the wearable device 410 by tracking the user's eyes, who is wearing the wearable device 410, using the eye tracker 299 of the wearable device 410. Hence, the processor 540 can locate the user's gazing region on the panorama image by considering the panorama image displayed at a corresponding location.

In operation 830, the processor 540 determines whether the determined gazing region includes at least part of the seam. The processor 540 can store the seam location determined from the image frames to generate the panorama image, in the storage unit 530 and determine whether at least part of the seam is included in the gazing region based on the determined gazing region location and seam location. For example, when a gazing region 910 is located at a seam 650-1 on a panorama image 630 as shown in FIG. 9, the processor 540 can determine that at least part of the seam 650-1 is included in the gazing region 910.

When the gazing region covers at least part of the seam, the processor 540 realigns the image frames based on the feature points of the gazing region on the generated image in operation 840. That is, the processor 540 can realign the image frames based on the gazing region. More specifically, the processor 540 aligns the image frames by extracting and matching the feature points throughout the image frames to generate the image in operation 810, and realigns the image frames by extracting and matching the feature points for the image frames in the gazing region in operation 840.

Figure 9:
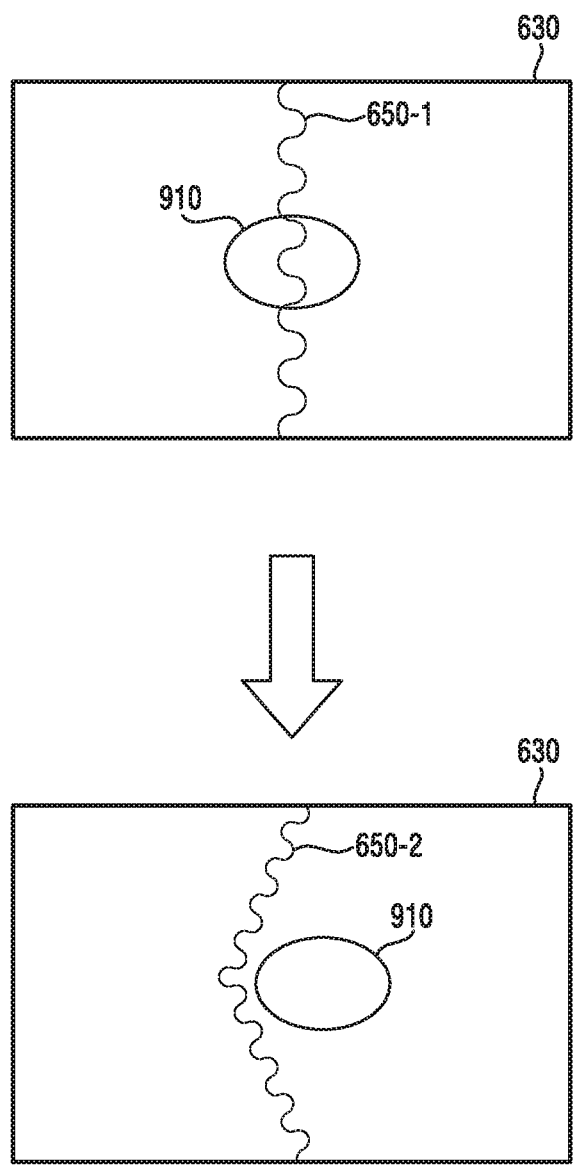
FIG. 9 illustrates a process for connecting a plurality of image frames such that a seam is placed outside a user's gazing region according to various embodiments of the present disclosure.

For example, when the gazing region 910 covers the seam 650-1 on the panorama image 630 as shown in FIG. 9, the processor 540 can realign the image frames based on feature points of the gazing region 910 on the image 630. A seam 650-2 after the realignment of the image frames may not be included at least in the gazing region 910 as shown in FIG. 9, and thus can minimize distortion when the user views the image 630.

However, the seam can still reside in the gazing region even after the image frames are realigned based on the gazing region. In this case, the processor 540 can minimize a stitching error by applying a separate algorithm for placing the seam outside the gazing region, to be explained, or by compensating for the exposure and the color between adjacent image frames based on the pixels of the gazing region. Although not depicted in FIG. 8, the processor 540 can realign the image frames based on the feature points of the gazing region and then display the image generated based on the realignment.

According to various embodiments, to place the seam outside the gazing region, the processor 540 can search for the seam again by setting a seam search weight on pixels of a current gazing region to be lower than a threshold. For example, when the gazing region 910 covers the original seam 650-1 as shown in FIG. 9, the processor 540 can search for the seam again by lowering the seam search weight on the pixels of the gazing region 910 including the pixels of the original seam 650-1. The processor 540 may not search for the seam in the pixels of the low weight, and accordingly the new seam 650-2 modified not to include the pixels of the gazing region 910 can be found. The processor 540 can re-search for the seam by lowering the seam search weight on the original seam 650-1 in the gazing region 910, to be lower than the threshold. The processor 540 can search candidate seams for generating the panorama image 630 for a seam of a high seam search weight. Since the seam search weight of the original seam 650-1 is low, the modified seam 650-2, rather than the original seam 650-1, can be determined as the seam on the panorama image 630.

Figure 10:
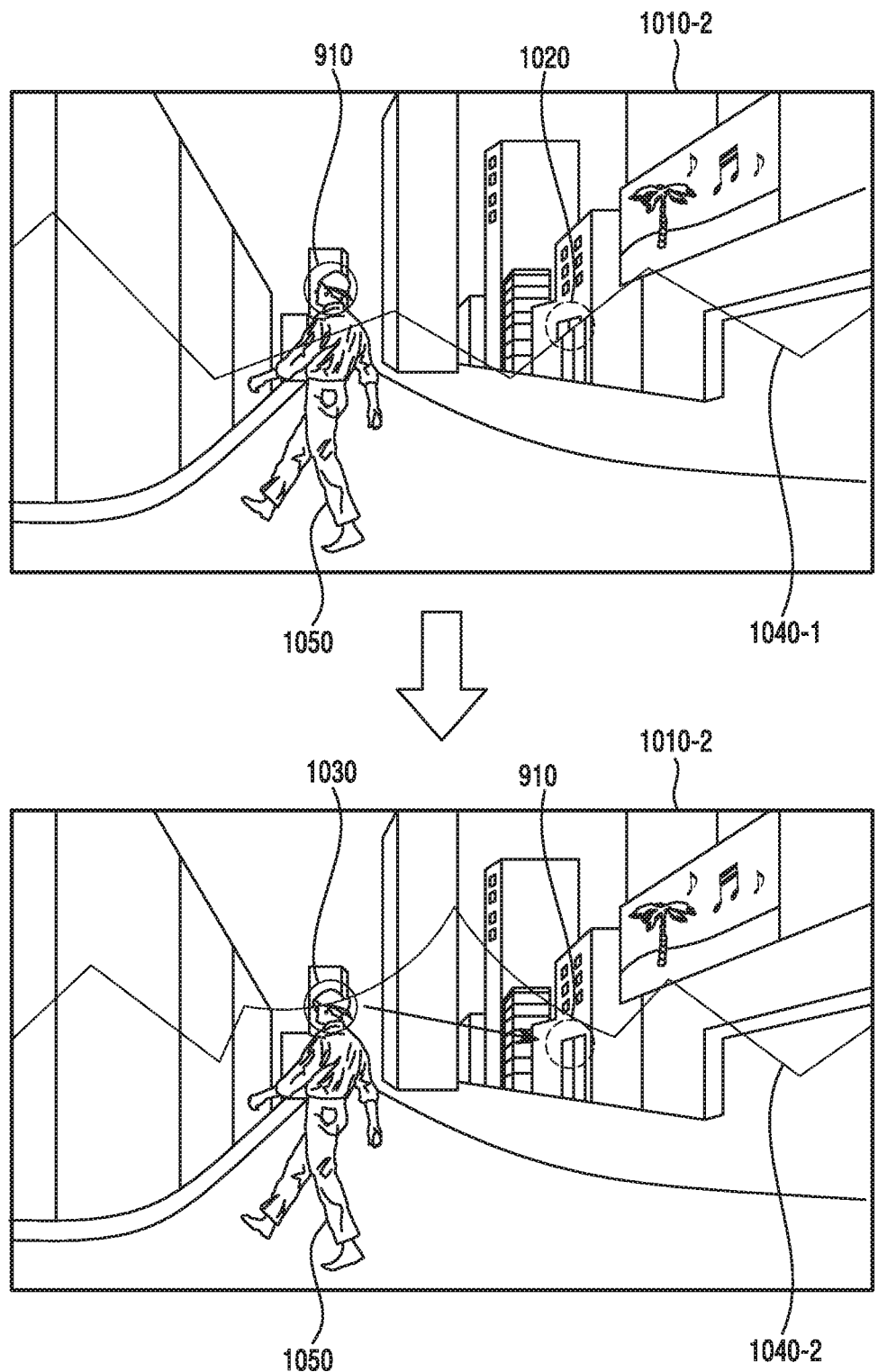
FIG. 10 illustrates realignment of image frames to remove a stitching error according to various embodiments of the present disclosure.

When the gazing region includes the seam, a specific embodiment for realigning the image frames based on the feature points of the gazing region shall be elucidated in FIG. 10. FIG. 10 illustrates realignment of image frames to remove a stitching error according to various embodiments of the present disclosure. In FIG. 10, a close object 1050 moves in a background image on a panorama image 1010-1. The close object 1050 and the background image can be distinguished based on, for example, a depth value corresponding to pixels of the close object 1050 or whether or not the object 1050 moves. In FIG. 10, it is assumed that the user gazes at a head portion of the human-shaped close object 1050. Namely, the gazing region 910 includes the head portion of the close object 1050. In the image 1010-2, the gazing region 910 does not include a seam 1040-1. At this time, when the user's eyes move to a door-shaped distant object 1020, the gazing region 910 can cover the seam 1040-1. Since the seam 1040-1 crosses the door-shaped distance object 1020, the user's gazing region 910 includes part of the seam 1040-1. Hence, to provide a high-quality image to the user, the processor 540 can realign the image frames which are used to generate the image 1010-1, based on feature points of the gazing region 910 in the image 1010-1. In other words, after aligning the image frames by extracting and matching the feature points throughout the image frames to generate the image 1010-1, the processor 540 can realign the image frames by extracting and matching the feature points of the image frames in the gazing region in order to generate an image 1010-2. In the realigned image 1010-2, a seam 1040-2 can be placed outside the gazing region 910. Thus, the door-shaped distant object in the user's current gazing region 910 can be viewed to the user without distortion. In the image 1010-2, the modified seam 1040-2 crosses the head portion 1030 of the close object 1050 which was originally in the user's gazing region 910. That is, the close object 1050 can be distorted. However, since the user's eyes stay on the distant object with the seam removed, an actual image quality experienced by the user can be high.

According to various embodiments, when the user's gazing region stays on the close object and on the distance object, whether or not to realign the images can be determined based on different criteria. For example, since the user mostly does not closely watch the distant object, a threshold time is set for the distant object. When the user views the distant object over the threshold time, that is, only when the time of the gazing region including the distant object exceeds the threshold time, the image can be operated.

In FIG. 10, when the user's eyes move from the close object to the distant object, the image frames are realigned in FIG. 10 by way of example. When the determined user's gazing region includes the seam, the processor 540 can realign the image frames regardless of whether the object is the close object.

Upon determining that the gazing region does not include the seam, the processor 540 determines the gazing region on the image back in operation 820. That is, when the current gazing region does not cover the seam, the processor 540 can determine the modified gazing region in order to determine whether the seam is included in the gazing region modified according to the image movement, the user's head gesture, or the user's eye movement, who is wearing the wearable device 410.

As described in FIGS. 8, 9 and 10, according to embodiments of the present disclosure, the electronic device 201 can provide the high-quality registered image to the user by realigning the image frames based on the feature points of the gazing region based on the gazing region determined according to the user's eye movement.

Figure 11:
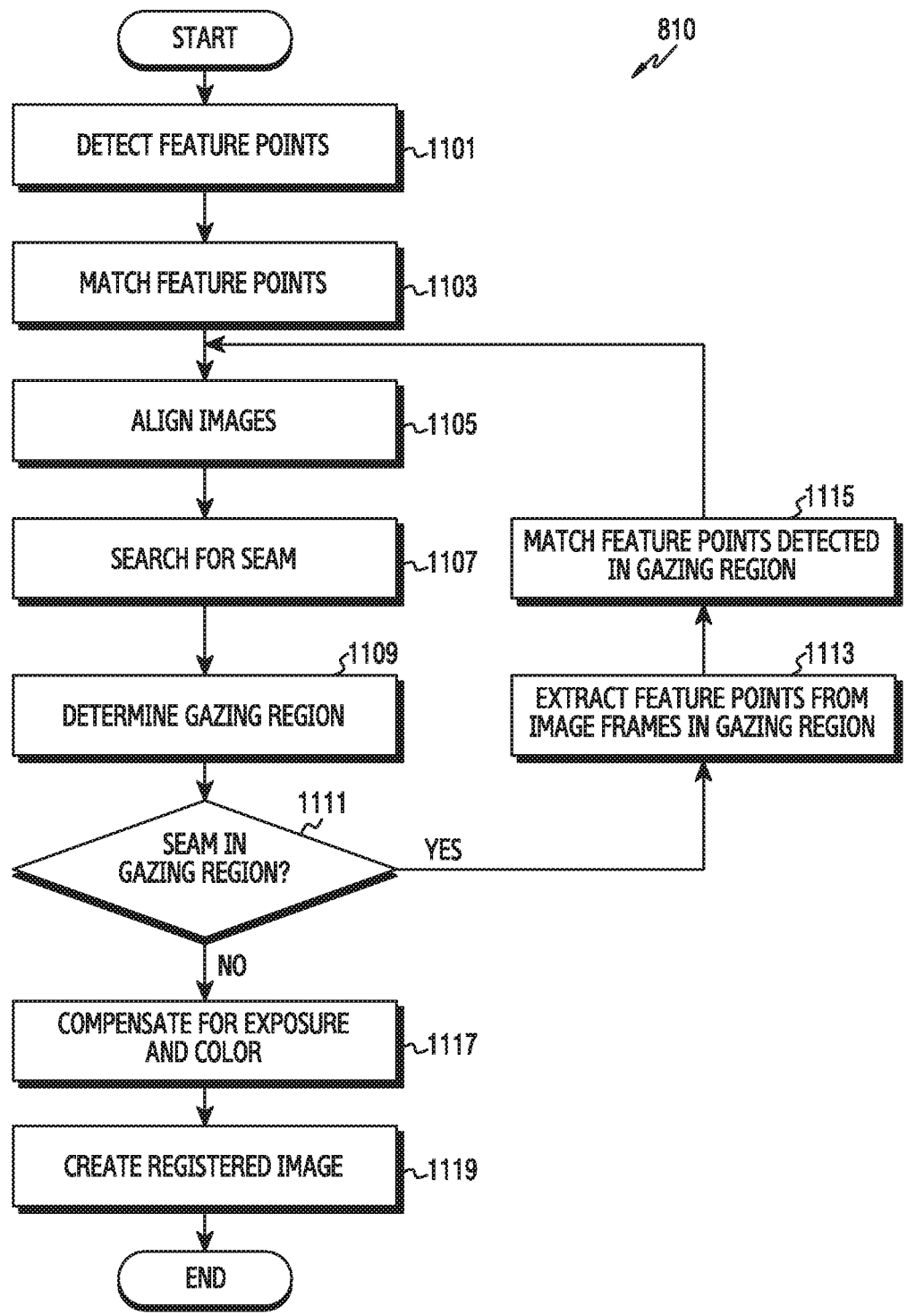
FIG. 11 illustrates a detailed flowchart of a method for generating an image by considering a user's gazing region according to various embodiments of the present disclosure.

FIG. 11 illustrates a detailed flowchart of a method for generating an image by considering a user's gazing region according to various embodiments of the present disclosure. To generate a panorama image based on a plurality of image frames, the processor 540 can consider a gazing region. FIG. 11 illustrates operations for generating the panorama image by considering the user's gazing region as stated above.

Referring to FIG. 11, in operation 1101, the processor 540 detects feature points from each image frame in order to generate the panorama image. The feature point detection in operation 1101 does not consider the user's gazing region, and the processor 540 can detect the feature points by taking into account the whole region of the image frames, or from a predefined location (e.g., an apex region of each image frame).

In operation 1103, the processor 540 matches the detected feature points. For example, the processor 540 can determine points of the same or similar pixel values among the feature points extracted from the image frames 610 and 620, as corresponding points.

In operation 1105, the processor 540 aligns the image frames based on the corresponding points. For example, the processor 540 can move at least one of the image frames such that the feature points of the image frames match the corresponding points. Namely, the processor 540 can superimpose the image frames by moving at least one of the image frames to overlap the corresponding points.

In operation 1107, the processor 540 searches for a seam so as to determine the seam in the aligned image frames. For example, the processor 540 can determine the seam based on a difference of a pixel value and a color and brightness parameter value of pixels of each image frame in the overlap region of the image frames. The processor 540 can determine the seam by considering a depth value corresponding to the pixels of the object in the image frame.

In operation 1109, the processor 540 determines a user's gazing region. For example, the processor 540 can track the user's eyes by controlling the eye tracker 299 and determine the gazing region in a user's gaze direction.

In operation 1111, the processor 540 determines whether the seam exists in the gazing region. For example, the processor 540 can store a location of the seam determined from the image frames in the storage unit 530, and determine the seam in the gazing region when the gazing region location is determined as the seam location.

When the seam exists in the gazing region, the processor 540 extracts feature points from the image frames included in the gazing region in order to realign the image frames in consideration of the gazing region in step 1113. Namely, unlike detecting the feature points throughout the image frames or at the predefined location without considering the user's gazing region in operation 1101, the processor 540 can extract the feature points in the gazing region from at least two image frames involved in the gazing region.

In operation 1115, the processor 540 matches the feature points detected in the gazing region. That is, the processor 540 can calculate pixel values of the feature points extracted from the gazing region and determine points of the same or similar pixel values as corresponding points. Next, back in operation 1105, the processor 540 realigns the image frames using the feature points and the corresponding points extracted in the gazing region.

When the gazing region does not cover the seam, the processor 540 compensates for exposure and color values of the image frames in operation 1117. That is, since the seam does not exist in the gazing region, the processor 540 can compensate for the exposure and color values of the image frames based on the current aligned image frames and the seam in order to generate a final registered image. For example, the processor 540 can uniform exposure and color parameters of the image frames throughout the registered image. In operation 1119, the processor 540 generates the final registered image.

Although the final registered image is generated by considering the user's gazing region in FIG. 11, the processor 540 may generate the registered image from the image frame without considering the user's gazing region and then realign the image frames by taking into account the user's gazing region on the registered image. That is, the processor 540 can find the seam of the aligned image frames according to a general image stitching procedure, and then generate the registered image by compensating for the exposure and color values of the image frames without considering the gazing region.

A stitching error in the gazing region can arise when the gazing region include a double image and/or a cut close object, or when the gazing region covers the image seam. To remove the stitching error, the processor 540 can realign the image frames based on the feature points in the gazing region throughout the panorama image as mentioned in FIG. 8 and FIG. 11. Now, an algorithm for realigning the image frames to remove the stitch error in the gazing region is explained in FIG. 12 and FIG. 13.

Figure 12:
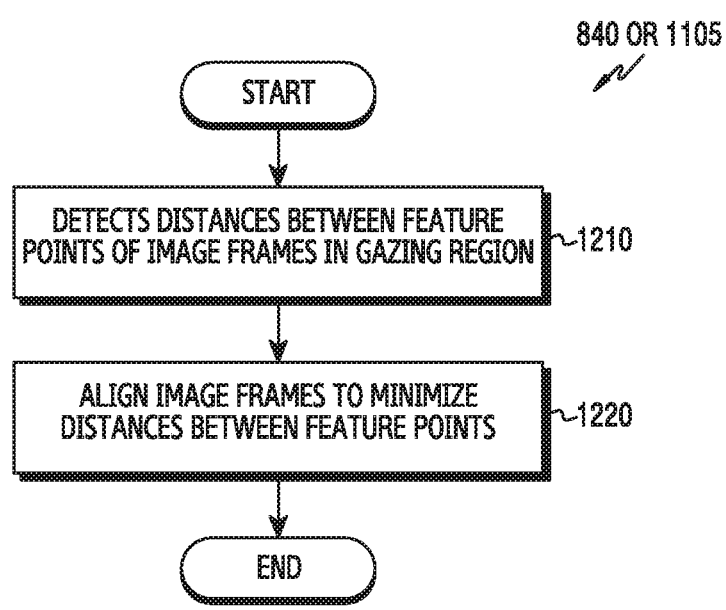
FIG. 12 illustrates a detailed flowchart of a method for realigning image frames by considering a gazing region according to various embodiments of the present disclosure.

FIG. 12 illustrates a detailed flowchart of a method for realigning image frames by considering a gazing region according to various embodiments of the present disclosure.

Figure 13:
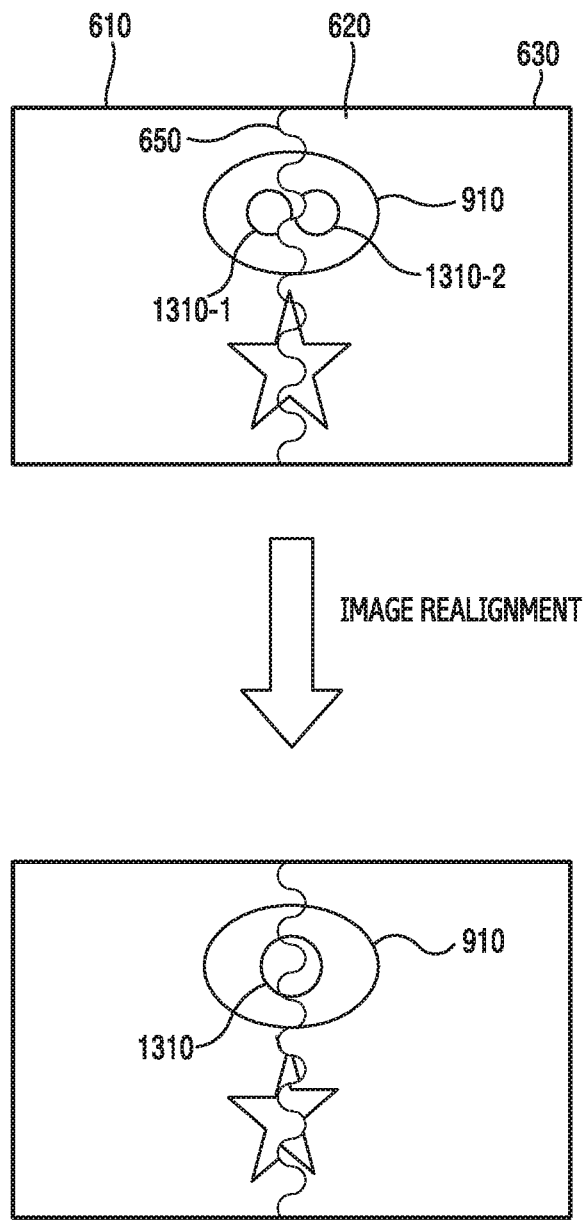
FIG. 13 illustrates detail operations for realigning image frames by considering a gazing region according to various embodiments of the present disclosure.

Referring to FIG. 12, in operation 1210, the processor 540 detects distances between feature points of image frames in a gazing region. For example, when the gazing region covers at least part of a seam or when the gazing region includes a stitching error such as a double image and/or a cut close object, the processor 540 can detect the distances between the feature points of the image frames in the gazing region. For example, the same object 1310-1 and 1310-2 can be divided by a seam 650-1 in two image frames 610 and 620 on a panorama image 630 as shown in FIG. 13. When the gazing region 910 is determined as shown in FIG. 13, the user can feel image quality degradation due to the double-image of the objects 1310-1 and 1310-2. To detect the distances between the feature points of the image frames in the gazing region, the processor 540 can extract the feature points from the image frame in the gazing region and determine corresponding points based on the extracted feature points.

In operation 1220, the processor 540 aligns the image frames to minimize the distances between the feature points. That is, the processor 540 aligns the image frames to minimize the distances between the corresponding points determined from the feature points. For example, the processor 540 can realign the image frames 610 and 620 to minimize the distances between the feature points by extracting the feature points in the gazing region 910, and thus the user's gazing region 910 can include the object 1310 with the double-image removed as shown in FIG. 13. While the double image of the object 1310 is removed from the gazing region 910 thanks to the image realignment, the gazing region 910 can still cover the seam 650. Contrary to FIG. 13, since candidate seams and an optimal seam can be changed by the image realignment, the seam 650 may not cross the object 1310 after the image frames 610 and 620 are realigned to minimize the distances between the feature points.

Figure 14:
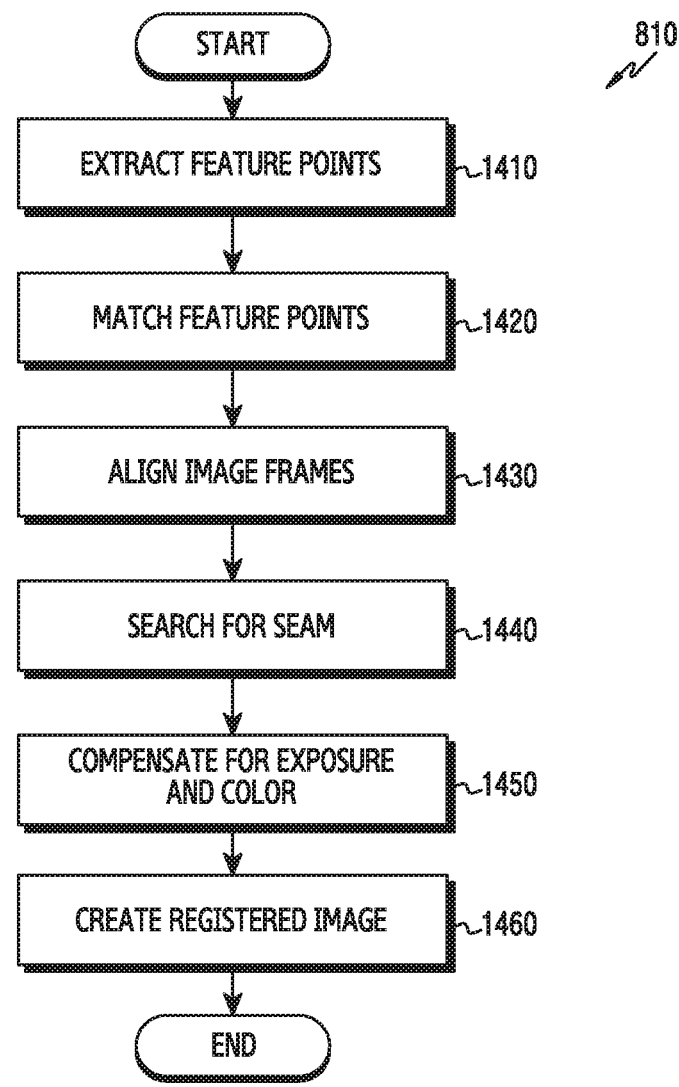
FIG. 14 illustrates a detailed flowchart of a method for generating a stitched image from image frames according to various embodiments of the present disclosure.

FIG. 14 illustrates a detailed flowchart of a method for generating a stitched image from image frames according to various embodiments of the present disclosure.

The processor 540 can generate a panorama image based on a plurality of image frames without considering a gazing region. That is, the method of FIG. 14 indicates general operations for generating the panorama image by stitching the image frames.

The processor 540 extracts feature points in the image frames in step 1410, determines corresponding points based on the feature points in step 1420, aligns the image frames according to the corresponding points in step 1430, and then searches for a seam in an overlap region of the image frames in operation 1440. Operations 1410 through 1440 are identical to the operations 1101 through 1107 of FIG. 11.

In operation 1450, the processor 540 compensates for exposure and color values of the image frames. That is, the processor 540 can compensate for the exposure and color values for the image frames based on the currently aligned image frames and the seam in order to generate a final registered image. For example, the processor 540 can uniform exposure and color parameters of the image frames throughout the registered image.

In operation 1460, the processor 540 generates the final registered image. Although not depicted, after generating the final registered image in step 1460, the processor 540 can additional conduct the operation 1111 and the subsequent operations of FIG. 11 to realign the image frames by considering the user's gazing region.

Figure 15:
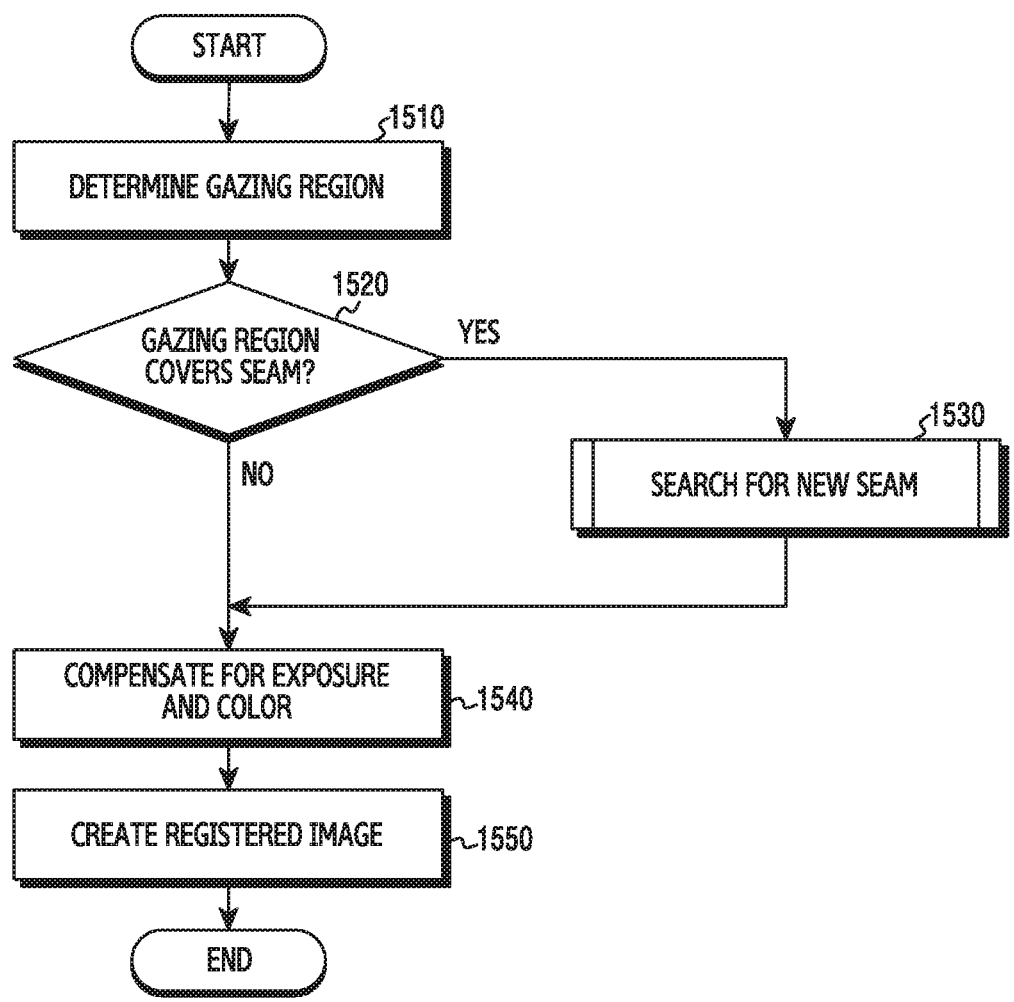
FIG. 15 illustrates a detailed flowchart of a method for placing a seam outside a user's gazing region on an image according to various embodiments of the present disclosure.

FIG. 15 illustrates a detailed flowchart of a method for placing a seam outside a user's gazing region on an image according to various embodiments of the present disclosure. In FIG. 15, the processor 540 is assumed to realign image frames based on feature points extracted in a gazing region including at least part of a seam and to search for a seam of the realigned image frames.

In operation 1510, the processor 540 determines a user's gazing region. For example, the processor 540 can track user's eyes by controlling the eye tracker 299, and determine the gazing region in the user's gaze direction.

In operation 1520, the processor 540 determines whether the gazing region includes the seam. That is, the processor 540 determines whether the gazing region covers at least part of the seam found in the realigned image frames.

When the gazing region covers the seam, the processor 540 searches for a new seam in operation 1530. For example, the processor 540 can find a new seam by setting a seam search weight of gazing region pixels to be lower than a threshold. For example, the processor 540 can re-search for the seam by lowering the seam search weight of the seam in the current gazing region.

In operation 1540, the processor 540 compensates for exposure and color values of the image frames. The processor 540 can compensates for the exposure and color values of the image frames based on the new seam. For example, the processor 540 can uniform exposure and color parameters of the image frames throughout the registered image. In operation 1550, the processor 540 generates a final registered image.

When the gazing region does not include the seam, the processor 540 compensates for the exposure and color values of the image frames in operation 1540. That is, since the gazing region does not include the seam, the processor 540 can compensate for the exposure and color values of the image frames based on the current seam to generate a final registered image without searching for a new seam. In operation 1550, the processor 540 generates the final registered image.

Figure 16:
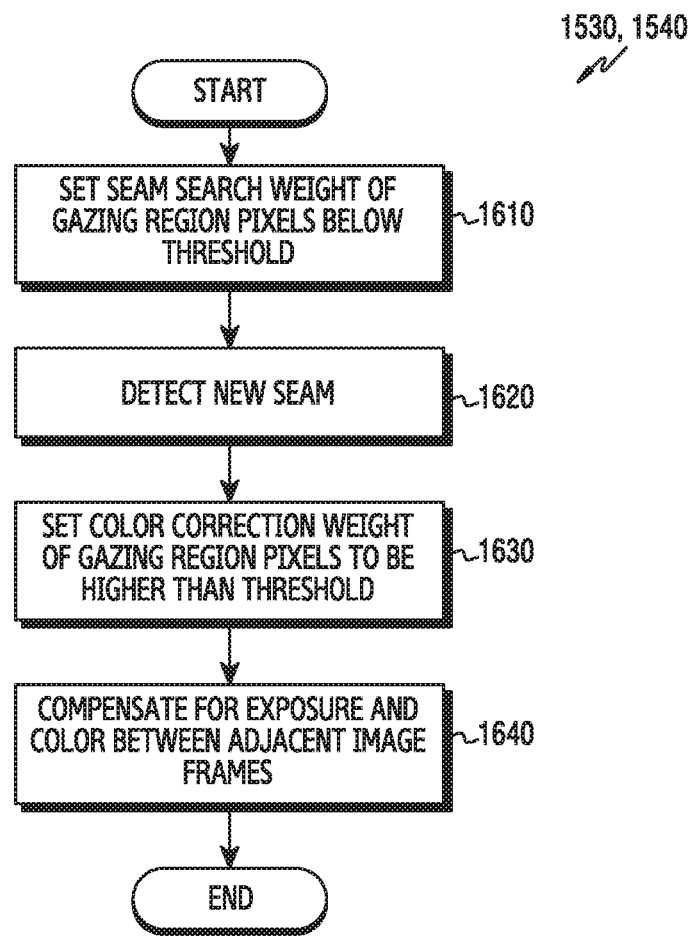
FIG. 16 illustrates a flowchart of operations in an electronic device when a gazing region covers a seam according to various embodiments of the present disclosure.

FIG. 16 illustrates a flowchart of operations in the electronic device 201 when a gazing region covers a seam according to various embodiments of the present disclosure.

In operation 1610, the processor 540 sets a seam search weight for gazing region pixels to be lower than a threshold. Thus, the processor 540 can make a newly determined seam not include the gazing region pixels, or give a low priority to a seam including the gazing region pixels.

In operation 1620, the processor 540 detects a new seam. The processor 540 can re-search for the seam with the seam search weight lower than the threshold with respect to the gazing region pixels. The processor 540 may not search the pixels of the low seam search weight for the seam, and thus can find the new seam not including the gazing region pixels.

After finding the new seam on a panorama image, the processor 540 sets exposure and color correction weights of the gazing region pixels to be higher than a threshold in operation 1630. That is, the processor 540 can compensate for the exposure and color values based on the gazing region pixels of the high weight throughout the panorama image. The processor 540 compensates for the exposure and the color between adjacent image frames divided by the new seam according to the exposure and color correction weights determined in operation 1640, and accordingly the exposure and color values of the panorama image are compensated based on the gazing region pixels. Thus, seam distortion experienced by the user can be reduced.

Figure 17:
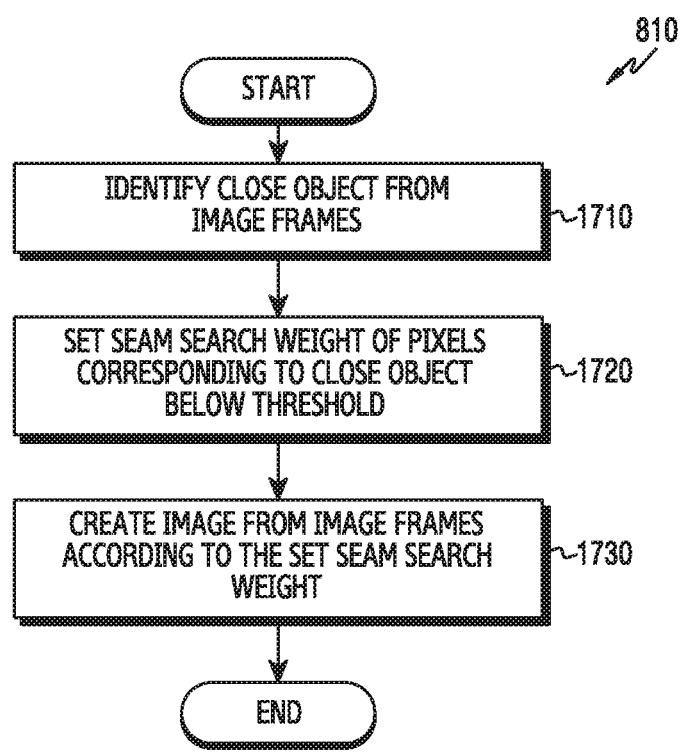
FIG. 17 illustrates a flowchart of a stitching method not to form a seam in a close object on an image according to various embodiments of the present disclosure.

FIG. 17 illustrates a flowchart of a method for stitching images not to generate a seam in a close object on an image according to various embodiments of the present disclosure. FIG. 17 illustrates the method of the processor 540 for generating a panorama image such that the seam does not cross the close object after image frames are aligned.

In operation 1710, the processor 540 identifies a close object from image frames. For example, based on a depth value corresponding to image pixels, the processor 540 can determine whether an object in the image is a close object. For example, the processor 540 can determine whether or not the object is the close object by detecting a movement of the object on the image.

In operation 1720, the processor 540 sets a seam search weight of pixels corresponding to the close object to be lower than a threshold. Thus, the processor 540 can determine a seam not including the pixels of the close object.

In operation 1730, the processor 540 generates an image from the image frames according to the determined seam search weight. That is, the processor 540 determines the seam of the aligned image frames according to the seam search weight, compensates for exposure and color between adjacent image frames divided by the seam, and thus generates a final registered image. The processor 540 may not search pixels of a low seam search weight for the seam, and a low seam search weight is set for the close object pixels. Accordingly, the processor 540 can detect the seam not including the close object pixels as the seam of the panorama image.

Figure 18:
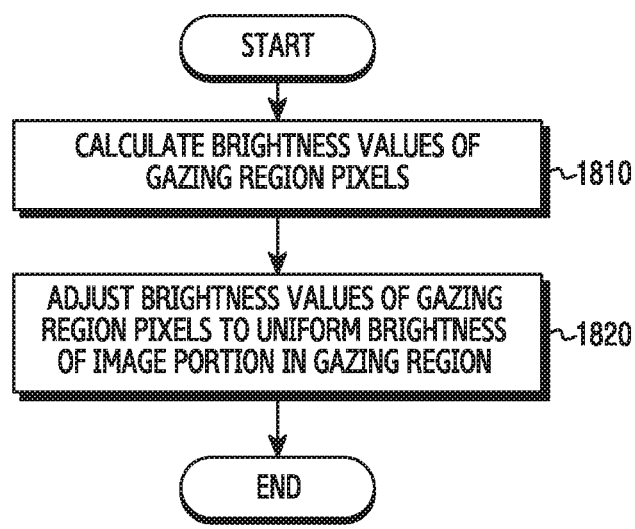
FIG. 18 illustrates a flowchart of a method for uniforming brightness of an image in part included in a user's gazing region according to various embodiments of the present disclosure.

FIG. 18 illustrates a flowchart of a method for uniforming brightness of an image in part included in a user's gazing region according to various embodiments of the present disclosure.

Figure 19:
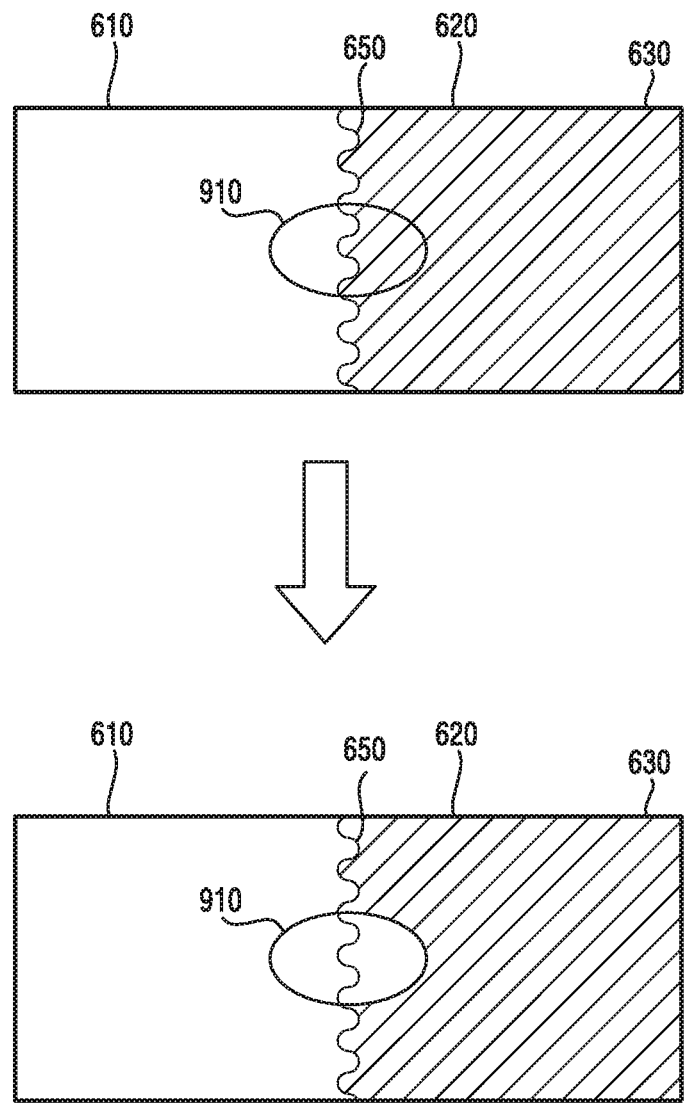
FIG. 19 illustrates operations for uniforming brightness of an image part included in a user's gazing region according to various embodiments of the present disclosure.

In a panorama image, even when a double-image is not generated by the seam or the double-mage does not outstand noticeably, the image quality experienced by the user can degrade due to bright differences between the adjacent image frames of the seam. For example, when the user's gazing region 910 includes the seam 650 in the panorama image 630 generated with the two image frames 610 and 620 as shown in FIG. 19, the user can feel the image quality degradation due to the brightness difference of the two image frames 610 and 620. In FIG. 19, hatching lines in the image frame 620 indicate darker brightness than the image frame 610. While the processor 540 can perform an operation to uniform the brightness throughout the panorama image 630, the processor 540 can reduce the operations and minimize the image quality degradation of the user by uniforming the brightness at least in the user's gazing region 910.

For example, when the gazing region includes at least part of the seam, the processor 540 may not be able to operate the image to place the seam outside the gazing region. For example, even when the seam not including the pixels of the gazing region causes image distortion over a threshold and the processor 540 re-searches for the seam by lowering the seam search weight on the gazing region pixels, a seam outside the gazing region may not be discovered. In this case, it is necessary to execute an operation for minimizing the image quality degradation of the user though the gazing region covers the seam. FIG. 18 illustrates a flowchart of a method for compensating for brightness values between adjacent image frames divided by a seam when the seam is included in the gazing region as stated above.

In operation 1810, the processor 540 calculates brightness values of gazing region pixels. For example, the processor 540 calculates the brightness of some pixels of the image 630 in the gazing region 910 as shown in FIG. 19. The brightness value of the pixels can be determined based on at least one information of a color, a gray level, and transparency of each pixel.

In operation 1820, the processor 540 adjusts the brightness value of the pixels to make the uniform brightness of the image portion included in the gazing region. For the uniform brightness of the image in the gazing region, the processor 540 can adjust the brightness value to the same brightness as the other image frames in the gazing region based on a certain image frame of the gazing region. For example, when the gazing region 910 includes part of the image frame 610 and part of the image frame 620 as shown in FIG. 19, the processor 540 can adjust the brightness value of some pixels of the image frame 620 so that the brightness of the image frame 620 in part is the same as the brightness of the image frame 610. Hence, as the brightness values of the pixels in at least the gazing region 910 are uniform, the user's image quality degradation can be minimized.

While the brightness value of one image frame in the gazing region is used to adjust the brightness value of the other image frames in FIG. 18 and FIG. 19 by way of example, another algorithm for uniforming the brightness in the gazing region can be adopted. For example, the processor 540 can calculate an average value of the brightness values of the image frames in the gazing region and thus adjust the brightness values of the gazing region pixels with the average value.

FIG. 20 illustrates a flowchart of a method for determining a gazing region to cover an object displayed on an image according to various embodiments of the present disclosure.

Referring to FIG. 20, in operation 2010, the processor 540 determines whether all or part of pixels corresponding to an object in an image is included in a pre-determined gazing region. Herein, the pre-determined gazing region can include the foveal area or the parafoveal area of FIG. 7. For example, as shown in FIG. 21, when the user views an object 2110, a gazing region 910-1 can include part (head portion) of pixels corresponding to the object 2110 on the image 630. Whether or not the gazing region covers part of the object can be determined in various manners. For example, when pixels forming a particular object are at the center of the gazing region, the processor 540 can determine that the gazing region includes part of the object. For example, when the number of pixels forming a particular object among the gazing region pixels exceeds a threshold, the processor 540 can determine that the gazing region covers some of the pixels corresponding to the object on the image.

When the pre-determined gazing region covers whole or part of the pixels corresponding to the object on the image, the processor 540 determines the pixels of the object as the gazing region in operation 2020. That is, the processor 540 can determine the gazing region as the pixels representing the object of at least one pixel at the user's gazing point. For example, when the pre-determined gazing region 910-1 includes some (head portion) of the pixels corresponding to the object 2110 on the image 630 as shown in FIG. 21, the processor 540 determines that the user closely views the object 2110 and determines the pixels of the object 2110 as a gazing region 910-2, that is, as an object region.

As the gazing region is determined as the object region, when the images are realigned by considering the gazing region, a stitching error in at least the object can be minimized. That is, the processor 540 can realign the image frames based on feature points in the image frames of the object region, and thus minimize the object distortion experienced by the user.

Figure 22:
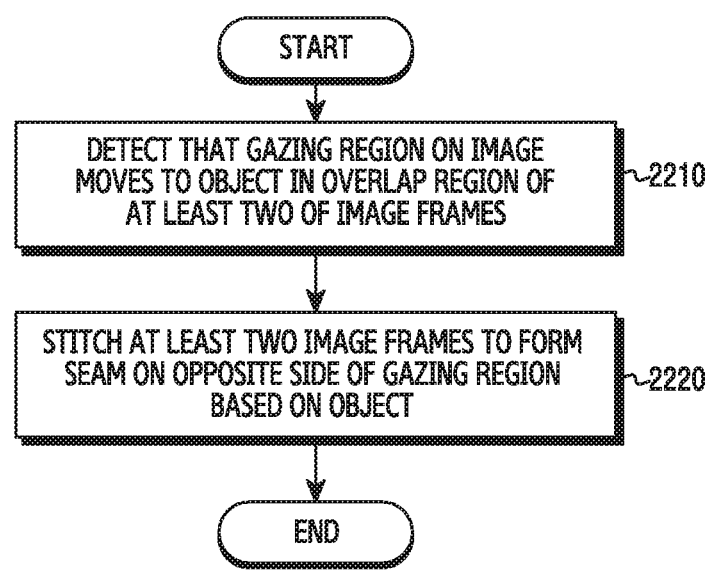
FIG. 22 illustrates a flowchart of a method for forming a seam by considering a user's eye movement direction on an image according to various embodiments of the present disclosure.

FIG. 22 illustrates a flowchart of a method for forming a seam by considering a user's eye movement direction on an image according to various embodiments of the present disclosure.

Figure 23:
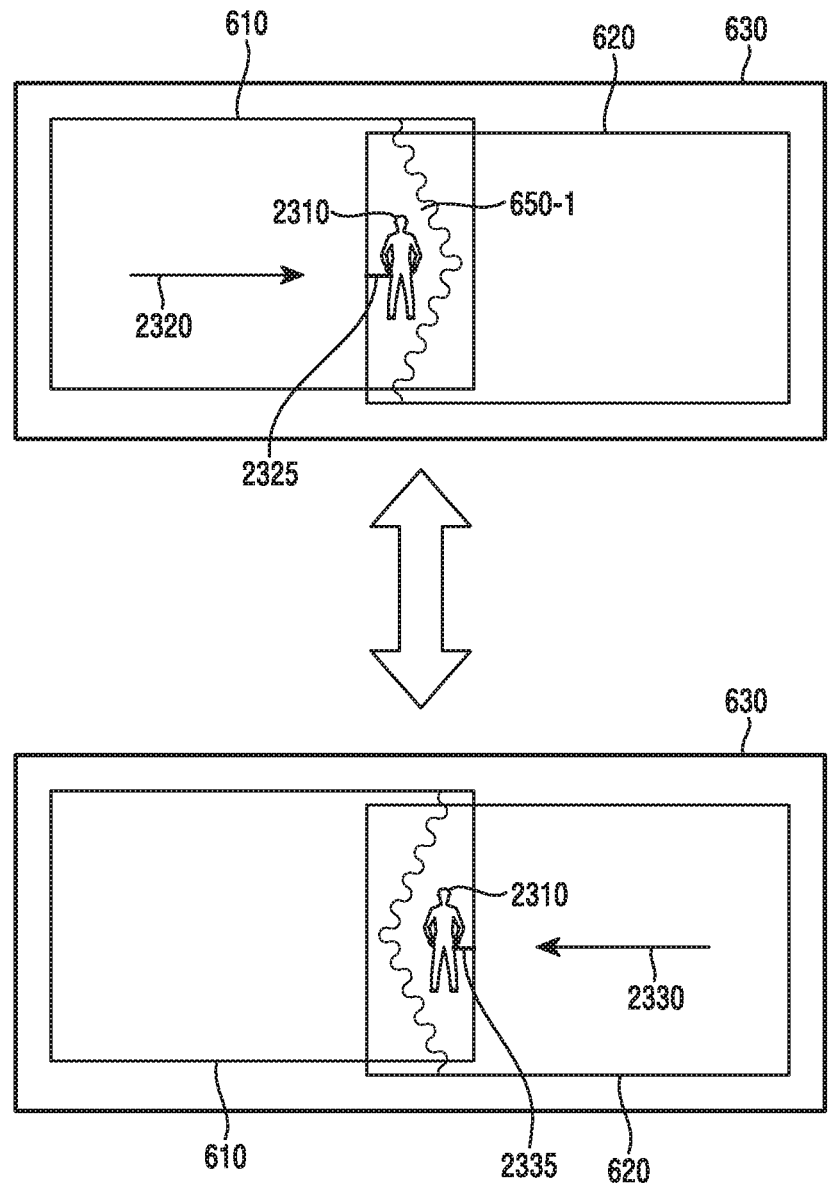
FIG. 23 illustrates operations for forming a seam by considering a user's gaze movement direction on an image according to various embodiments of the present disclosure.

Referring to FIG. 22, in operation 2210, the processor 540 detects that a gazing region moves to an object in an overlap region of at least two of image frames on an image. For example, as shown in FIG. 23, the processor 540 can detect that a gazing region moves from left to right 2320 toward an object 2310 in an overlap region of at least two image frames 610 and 620 of the image frames on the image 630. The processor 540 determines the movement direction of the gazing region as follows.

For example, the processor 540 can determine predicted direction and speed of the gazing region movement according to a user's head gesture using motion tracking information. For example, the processor 540, which can locate the user's gazing region using the eye tracker 299, can measure a location change (e.g., a location change of a gazing region center point) of the gazing region based on time and thus detect the movement speed and direction of the gazing region. When receiving image frames for generating a panorama image from the server 106, the communication unit 520 can receive from the server 106 statistical data about a general eye movement pattern on the image frames and the processor 540 can predict the movement direction and/or speed of the gazing region based on the statistical data. For example, when a particular object moves on the image, the user's eyes track the moving object and accordingly the processor 540 can determine that the gazing region moves along the object movement direction on the image.

In operation 2220, the processor 540 stitches at least two image frames to form a seam on the opposite side of the gazing region based on the object. For example, when the gazing region moves from left to right 2320 toward the object 2310 in the overlap region as shown in FIG. 23, the processor 540 can stitch at least two image frames to form a seam 650-1 on the opposite side of the current gazing region based on the object 2310. For example, when the gazing region moves from right to left 2330 toward the object 2310 in the overlap region, the processor 540 can stitch at least two image frames to form a seam 650-2 on the opposite side of the current gazing region based on the object 2310. To form the seam on the opposite side of the current gazing region based on the object, for example, the processor 540 can use virtual lines 2325 and 2335 of FIG. 23. That is, the processor 540 can generate the virtual lines 2325 and 2335 linking the object 2310 and an overlap region edge and thus lower a seam search weight on pixels corresponding to the virtual lines and the object 2310. Hence, since the new seam searched is determined not to cover the pixels corresponding to the virtual lines 2325 and 2335 and the object 2310, the processor 540 can complete stitching at least two image frames so as to form the seam on the opposite side of the gazing region based on the object.

Figure 24:
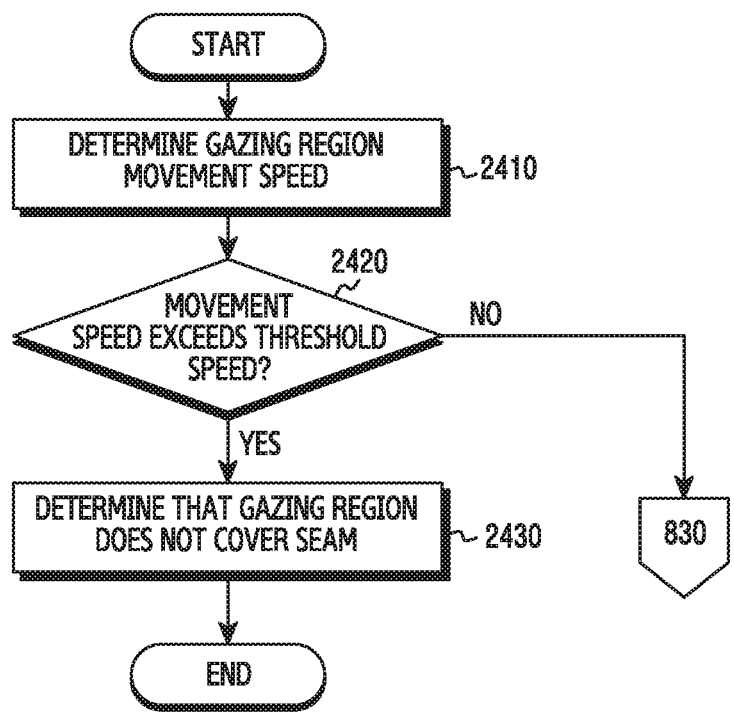
FIG. 24 illustrates a flowchart of a method for searching for a seam based on a gazing region movement speed on an image according to various embodiments of the present disclosure.

FIG. 24 illustrates a flowchart of a method for searching for a seam based on a gazing region movement speed on an image according to various embodiments of the present disclosure.

Referring to FIG. 24, in operation 2410, the processor 540 determines a gazing region movement speed. The gazing region movement speed can be determined based on, for example, at least one of motion tracking information, a gazing region location change based on time, statistical data received from a server, and an object movement speed on an image.

Figure 25:
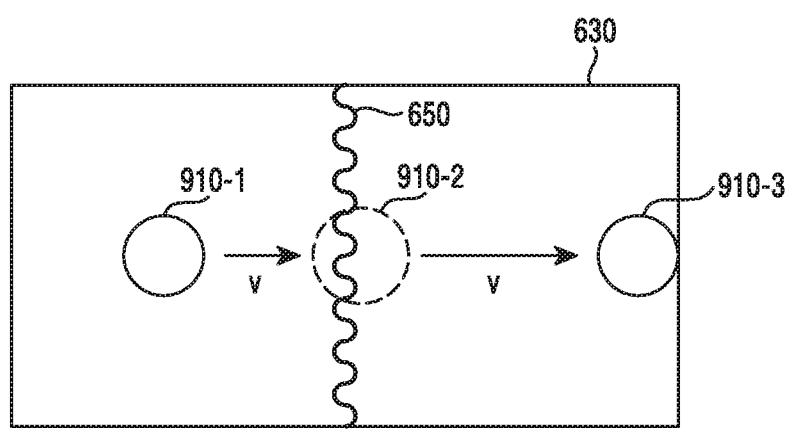
FIG. 25 illustrates operations for searching for a seam based on a gazing region movement speed on an image according to various embodiments of the present disclosure.

In operation 2420, the processor 540 determines whether the movement speed exceeds a threshold speed. For example, when the gazing region 910 moves from left to right at a speed v on the panorama image 630 as shown in FIG. 25, the gazing region 910-2 can include the seam 650 for a moment. As the gazing region 910-2 covers the seam 650, the processor 540 can operate the image 630 to place the seam 650 outside the gazing region 910-2. However, the user's eyes cross the seam 650. In so doing, the gazing region 910-2 covers the seam 650 for a second and the user does not closely look at the seam 650. Hence, the operation for removing the seam 650 from the gazing region 910-2 can be unnecessary. In other words, when the movement speed of the gazing region 910 exceeds the threshold, the user's eyes cross the seam 650 without recognizing the seam 650 and thus the operations can be reduced even in the adaptive image stitching by omitting the operation for removing the seam 650.

When the movement speed of the gazing region exceeds the threshold speed, the processor 540 determines that the gazing region does not include the seam in operation 2430. That is, regardless of whether or not the gazing region actually includes the seam, when the movement speed of the gazing region exceeds the threshold speed, the processor 540 can determine that the gazing region does not cover the seam and thus omit the operation for realigning the image frames or re-searching for the seam.

When the movement speed of the gazing region falls below the threshold speed, the processor 540 determines whether the gazing region includes the seam in operation 830. That is, when the movement speed v of the gazing region falls below the threshold speed, the user can recognize the seam on a movement path of the gazing region and the processor 540 determines whether the gazing region covers the seam on the premise of the operation for placing the seam outside the gazing region. Next, according to whether the gazing region includes the seam, the processor 540 goes to operation 840 or 820 in FIG. 8.

When stitching the image frames in consideration of the gazing region, the processor 540 can sequentially stitch the gazing region and its peripheral region. For example, when the user watches a particular object on the image, a foveal area is formed at the particular object and the processor 540 can expect that the user watches the particular object and then moves his/her eyes to a periphery of the particular object. That is, since the user's eyes are expected to move from the current foveal area to the parafoveal area, the processor 540 can first stitch the foveal areas and then stitch the parafoveal areas which is expected to be viewed by the user later, thus minimizing the stitching time. As such, the sequential stitching of the foveal area and the parafoveal area shall be elucidated in FIG. 26 and FIG. 27.

Figure 26:
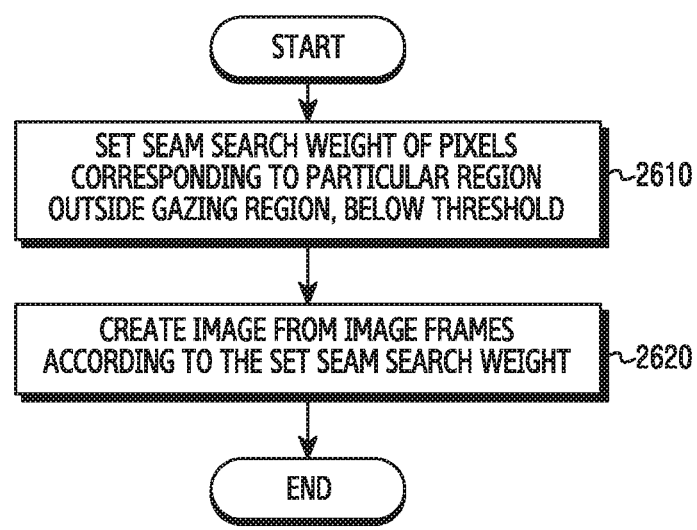
FIG. 26 illustrates a flowchart of a method for stitching images by considering a user's parafoveal vision according to various embodiments of the present disclosure.

FIG. 26 illustrates a flowchart of a method for stitching images by considering a user's parafoveal vision according to various embodiments of the present disclosure.

Figure 27:
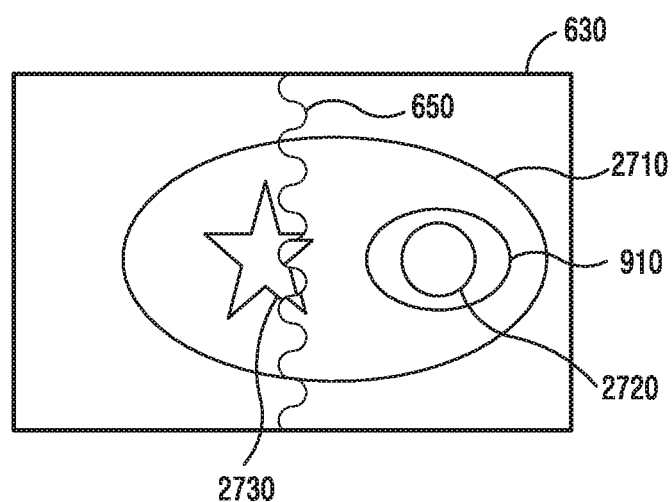
FIG. 27 illustrates operations for stitching images by considering a user's parafoveal vision according to various embodiments of the present disclosure.

Referring to FIG. 26, in operation 2610, the processor 540 sets a seam search weight of pixels corresponding to a particular region outside a gazing region, to be lower than a threshold. According to an embodiment, the gazing region can correspond to a foveal area, and the particular region outside the gazing region can correspond to a parafoveal area. That is, the particular region outside the gazing region can be determined based on the gazing region. For example, as shown in FIG. 27, when the user views an object 2720, the gazing region 910 is formed around a head of the object 2720. Since it is expected that the user's eyes move from the object 2720 to an object 2730 in a particular region 2710 outside the gazing region 910, the processor 540 can operate the image 630 to place the seam 650 of the particular region 2710 outside the gazing region 910, outside the particular region 2710 though the current gazing region 910 does not cover the seam 650. For doing so, the processor 540 can set the seam search weight of the pixels corresponding to the particular region 2710 outside the gazing region 910, to be lower than the threshold.

In operation 2620, the processor 540 generates an image from a plurality of image frames according to the determined seam search weight. That is, since the low seam search weight is defined for the pixels corresponding to the particular region outside the gazing region, the processor 540 can determine a new seam not including the pixels corresponding to the particular region. For example, in FIG. 27, the seam 650 is newly defined not to include the pixels corresponding to the particular region 2710, a stitching error due to the seam 650 can be removed from the object 2730. Thus, even when the user moves his/her eyes to the object 2730 in the particular region 2710 and the gazing region 910 is formed around the object 2730, the user can view the object 2730 without distortion. Although not depicted, after finding the new seam, the processor 540 can compensate for the exposure and the color of the image frames and thus generate a final registered image.

According to an embodiment of the present disclosure, the electronic device can provide a high-quality registered image to the user by adaptively stitching the displayed images by considering the user's gazing region.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Meanwhile, the aforementioned exemplary embodiments of the present invention may be writable as a program executable in a computer, and may be implemented in a general purpose digital computer for operating the program by using a computer-readable recording medium. In addition, a data structure used in the aforementioned exemplary embodiment of the present invention may be recorded in the computer-readable recording medium through several means. The computer-readable recording medium includes a storage medium such as a magnetic medium (e.g., a Read Only Memory (ROM), a floppy disc, a hard disc, etc.) and an optical storage medium (e.g., a Compact Disc-ROM (CD-ROM), a Digital Versatile Disc (DVD), etc.).

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, it shall be considered that the disclosed exemplary embodiments are provided not for a restrictive purpose but for an illustrative purpose. The scope of the invention is defined not by the detailed description of the invention but by the appended claims and their equivalents, and all differences within the scope will be construed as being included in the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display; and
a processor configured to:
display an image that combines at least two partial images;
obtain, while displaying the image, information regarding a field-of-view (FOV) of a user;
identify, while displaying the image, a boundary between the at least two partial images is directed by the FOV of the user; and
in response to identifying that the boundary is overlapped with at least portion of the FOV, adjust a representation of the boundary in the image,
wherein the at least two partial images are sequentially obtained by an image sensor of the electronic device for being combined with each other to make the image.

2. The electronic device of claim 1, wherein, if the FOV of the user moves toward an object in an overlap region of at least two partial images, adjust the representation of the boundary to be formed on an opposite side of the FOV of the user based on the object.

3. The electronic device of claim 2, wherein a movement direction of the FOV of the user is determined based on at least one of motion tracking information relating to a movement of the electronic device, a statistical characteristic relating to the FOV of the user received from a server, a movement direction of the object on the image, or location change information of the FOV of the user based on time.

4. The electronic device of claim 1, wherein the processor is configured to lower a boundary search weight of pixels in the FOV of the user below a threshold such that the FOV does not cover at least part of the boundary between the at least two partial images,
wherein the boundary search weight is a weight assigned to each candidate boundary to determine the boundary.

5. The electronic device of claim 1, wherein the processor is configured to:
identify a close object from the at least two partial images;
lower a boundary search weight of pixels corresponding to the close object below a threshold; and
generate the image from the at least two partial images according to the boundary search weight,
wherein the boundary search weight is a weight assigned to each candidate boundary to determine the boundary.

6. The electronic device of claim 1, wherein the processor is configured to adjust the representation of the boundary to minimize distances between feature points of the at least two partial images that overlap in the at least portion of the FOV of the user.

7. The electronic device of claim 1, wherein the processor is configured to:
calculate brightness values of pixels in the FOV of the user; and
adjust the brightness values of the pixels to uniform brightness of the at least two partial images in the FOV of the user.

8. The electronic device of claim 1, wherein the processor is configured to determine a region of pixels representing an object comprising at least one pixel located at a gazing point of the user, as the FOV of the user.

9. The electronic device of claim 1, wherein, if a movement speed of the FOV of the user on the image exceeds a threshold, the processor is configured to determine that the FOV of the user does not cover the boundary.

10. The electronic device of claim 1, wherein, after adjusting the representation of the boundary, the processor is configured to set a boundary search weight on pixels corresponding to a particular region outside the FOV of the user determined based on the FOV of the user to be lower than a threshold,
wherein the boundary search weight is a weight assigned to each candidate boundary to determine the boundary.

11. A method for operating an electronic device, comprising:
displaying an image that combines at least two partial images;
obtaining, while displaying the image, information regarding a field-of-view (FOV) of a user;
identifying, while displaying the image, a boundary between the at least two partial images is directed by the FOV of the user; and
in response to identifying that the boundary is overlapped with at least portion of the FOV, adjusting a representation of the boundary in the image,
wherein the at least two partial images are sequentially obtained by an image sensor of the electronic device for being combined with each other to make the image.

12. The method of claim 11, wherein, if the FOV of the user moves toward an object in an overlap region of at least two partial images, adjusting the representation of the boundary to be formed on an opposite side of the FOV of the user based on the object.

13. The method of claim 12, wherein a movement direction of the FOV of the user is determined based on at least one of motion tracking information relating to a movement of the electronic device, a statistical characteristic relating to the FOV of the user received from a server, a movement direction of the object on the image, or location change information of the FOV of the user based on time.

14. The method of claim 11, further comprising:
lowering a boundary search weight of pixels in the FOV of the user below a threshold such that the FOV of the user does not cover at least part of the boundary between the at least two partial images,
wherein the boundary search weight is a weight assigned to each candidate boundary to determine the boundary.

15. The method of claim 11, further comprising:
identifying a close object from the at least two partial images;
lowering a boundary search weight of pixels corresponding to the close object, below a threshold; and
generating the image from the at least two partial images according to the boundary search weight,
wherein the boundary search weight is a weight assigned to each candidate boundary to determine the boundary.

16. The method of claim 11, further comprises:
adjusting the representation of the boundary to minimize distances between feature points of the at least two partial images that overlap in the at least portion of the FOV of the user.

17. The method of claim 11, further comprising:
calculating brightness values of pixels in the FOV of the user; and
adjusting the brightness values of the pixels to uniform brightness of the at least two partial images in the FOV of the user.

18. The method of claim 11, wherein determining the FOV of the user comprises:
determining a region of pixels representing an object comprising at least one pixel located at a gazing point of the user, as the FOV of the user.

19. The method of claim 11, further comprising:
if a movement speed of the FOV of the user on the image exceeds a threshold, determining that the FOV of the user does not cover the boundary.

20. The method of claim 11, further comprising:
after adjusting the representation of the boundary, setting a boundary search weight on pixels corresponding to a particular region outside the FOV of the user determined based on the FOV of the user to be lower than a threshold,
wherein the boundary search weight is a weight assigned to each candidate boundary to determine the boundary.

* * * * *